(12) United States Patent
Matsuda et al.

(10) Patent No.: US 11,329,591 B2
(45) Date of Patent: May 10, 2022

(54) POWER CONVERSION APPARATUS HAVING TWO DC VOLTAGE MODES AND MOTOR DRIVE APPARATUS

(71) Applicant: FANUC CORPORATION, Yamanashi (JP)

(72) Inventors: Ryou Matsuda, Yamanashi (JP); Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/902,267

(22) Filed: Jun. 16, 2020

(65) Prior Publication Data

US 2020/0412291 A1    Dec. 31, 2020

(30) Foreign Application Priority Data

Jun. 26, 2019 (JP) .............................. JP2019-118995

(51) Int. Cl.
*H02P 27/08* (2006.01)
*H02M 5/458* (2006.01)

(52) U.S. Cl.
CPC ............ *H02P 27/08* (2013.01); *H02M 5/458* (2013.01)

(58) Field of Classification Search
CPC .......... H02M 7/00; H02M 7/003; H02M 7/08; H02M 7/062; H02M 7/125; H02M 7/26; H02M 7/28; H02M 7/42; H02M 7/487; H02M 7/537; H02M 7/5381; H02M 7/5387; H02M 11/00; H02P 27/00; H02P 27/04; H02P 27/06; H02P 1/00; H02P 23/00;

(Continued)

(56) References Cited

U.S. PATENT DOCUMENTS 5,729,450 A * 3/1998 Dimino ................. H02M 7/003
                                                    363/132
7,054,173 B2 * 5/2006 Rayner ................. H02M 5/458
                                                     361/16

(Continued)

FOREIGN PATENT DOCUMENTS

| JP | H538061 A   | 2/1993  |
| JP | H523795 U   | 3/1993  |
| JP | H10295081 A | 11/1998 |

(Continued)

*Primary Examiner* — Antony M Paul
(74) *Attorney, Agent, or Firm* — Hauptman Ham, LLP

(57) ABSTRACT

A power conversion apparatus includes: an inverter unit; a first capacitor group, an positive electrode of the first capacitor group connected to an positive electrode on the DC input side of the inverter unit; a second capacitor group, a negative electrode of the second capacitor group connected to a negative electrode of the DC input side of the inverter unit; a first terminal portion connected to the positive electrode of the first capacitor group; a second terminal portion connected to a negative electrode of the first capacitor group; a third terminal portion connected to an positive electrode of the second capacitor group; and a fourth terminal portion connected to the negative electrode of the second capacitor group, wherein a distance between the first terminal portion and the third terminal portion is approximately equal to a distance between the second terminal portion and the fourth terminal portion.

11 Claims, 12 Drawing Sheets

(58) Field of Classification Search
CPC .. H02P 25/00; H02P 21/00; H02P 7/00; H02P 7/29; H02P 6/00
See application file for complete search history.

(56) References Cited

U.S. PATENT DOCUMENTS 9,024,559 B2 * 5/2015 Adiga-Manoor .... H03K 17/168
318/400.3
9,153,374 B2 * 10/2015 Kulkarni ................ H01F 27/18

FOREIGN PATENT DOCUMENTS

| JP | 2004358543 A | 12/2004 |
|---|---|---|
| JP | 2005243742 A | 9/2005 |

* cited by examiner

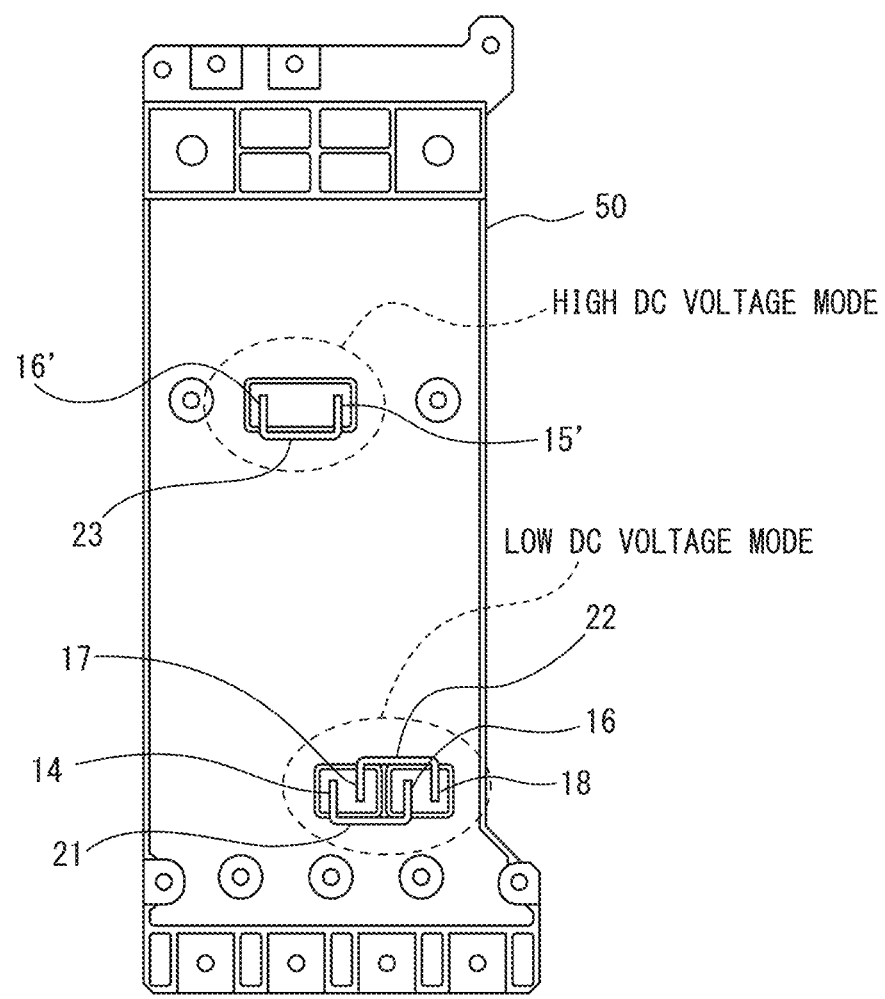

POWER CONVERSION APPARATUS HAVING TWO DC VOLTAGE MODES AND MOTOR DRIVE APPARATUS

RELATED APPLICATIONS

The present application claims priority to Japanese Application Number 2019-118995, filed Jun. 26, 2019, the disclosure of which is hereby incorporated by reference herein in its entirety.

BACKGROUND OF THE INVENTION

1. Field of the Invention

The present invention relates to a power conversion apparatus having two DC voltage modes and a motor drive apparatus.

2. Description of the Related Art

In machine tools, forging machinery, injection molding machines, industrial machinery, or motor drive apparatuses for controlling driving of motors in various types of robots, an AC voltage input from an AC power supply is converted by a rectifier (converter) into a DC voltage, which is output to a DC link; subsequently, the DC voltage at the DC link is further converted by an inverter into an AC voltage, and the AC voltage is supplied as a drive voltage to a motor provided for each drive axis. A "DC link" refers to a circuit portion that electrically connects DC output terminals of a rectifier to DC input terminals of an inverter; alternatively, it may be referred to as a "DC link unit", a "direct current link", a "direct current unit", a "DC bus line", a "DC intermediate circuit", or the like.

A DC link is provided with a capacitor having a function to reduce a pulsating component of a DC output from a rectifier as well as a function to store DC power. Such a capacitor is referred to as a smoothing capacitor or a DC link capacitor. The more DC power the DC link can store, the more drive power the inverter can supply to the motor, allowing greater flexibility in controlling the motor. For this reason, as a capacitor provided in a DC link, a single high capacitance capacitor or a plurality of capacitors connected in parallel are used.

An electrolytic capacitor, which is often used as a capacitor in a DC link, has an advantage that it can ensure a high capacitance with a small size while it has a disadvantage that the breakdown voltage is low. Therefore, in order to enable a DC link to withstand a high DC voltage, a plurality of capacitors may be connected in series, or capacitor groups each consisting of a plurality of capacitors connected in parallel may be connected in series.

For example, in a motor drive apparatus used in areas, such as the United States or Europe, where the AC supply voltage is high, the DC voltage after rectification by a rectifier, i.e., the DC voltage to be applied to a capacitor in a DC link is high (e.g., 400 V). In such a case, it is common to connect a plurality of capacitors in series to prevent a voltage applied to each capacitor from exceeding the breakdown voltage. In contrast, in a motor drive apparatus used in areas where the AC supply voltage is low, the DC voltage to be applied to a capacitor in a DC link is low (e.g., 200 V), and may not exceed the breakdown voltage of the capacitor. In such a case, it is not necessary to connect a plurality of DC link capacitors in series.

As described above, areas of low AC supply voltage and areas of high AC supply voltage requires different configurations for the DC input side (i.e., the DC link) of the inverter in a motor drive apparatus; therefore, it is necessary to construct different types of inverters. As a result, there has been a problem that the number of components tends to be increased. To address this problem, in the production of a motor drive apparatus, the apparatus is manufactured by constructing two capacitor groups each consisting of a plurality of capacitors connected in parallel and employing a change-over component to enable a connection relation between the two capacitor groups to be selectively switched, thus enabling efficient production of the motor drive apparatus according to the shipped area at low cost. For example, when manufacturing a motor drive apparatus to be shipped to a high AC supply voltage area, two capacitor groups are connected in series using a change-over component; when manufacturing a motor drive apparatus to be shipped to a low AC supply voltage area, two capacitor groups are connected in parallel using a change-over component.

For example, as disclosed in Japanese Unexamined Patent Publication No. 2004-358543, there has been known a power supply device for equipment utilizing arc, including: an input rectifier for rectifying an AC voltage received at input terminals; a direct current generation means including first and second inverters connected to the output side of the input rectifier, high-frequency transformers connected to the output side of the respective inverters, and output rectifiers connected to the output side of the respective high-frequency transformers; and a switching means for switching the DC voltage on the input side of the respective inverters according to two types of receiving voltages, the power supply device for equipment utilizing arc characterized in that direct current and alternating current may be switched at a portion where output terminals of the input rectifier are connected to the input terminals of the inverter and a predetermined DC voltage is supplied to the input terminals of the inverter, the power supply device for equipment utilizing arc further including, a voltage balance control means for reducing, in a case of a series connection, imbalance in voltage dividing between the input side voltage of the first inverter and the input side voltage of the second inverter.

For example, as disclosed in Japanese Unexamined Patent Publication No. H05-038061, there has been known a charging circuit apparatus for charging a battery using power converted by an input power supply circuit having a wiring pattern formed on a substrate, the charging circuit apparatus characterized in that the input power supply circuit is constructed as a full-wave rectifier circuit or a half-wave rectifier circuit by mounting, on the wiring pattern, an appropriate component between predetermined lands or linking lands for which an appropriate component is not provided with a jumper component, the lands being wiring portions commonly used in wirings for the full-wave rectifier circuit and the half-wave rectifier circuit.

For example, as disclosed in Japanese Unexamined Utility Model Publication No. H05-023795U, there has been known a power supply device having an inverter configured to operate by receiving input power from either of two types of AC power supplies, i.e., a low-voltage AC power supply or a high-voltage AC power supply as the input power source by means of switching the internal connection, the power supply device including: an input rectifier for rectifying the input power; first and second smoothing capacitors having one end respectively connected to a positive output terminal and a negative output terminal of the input rectifier;

a connection switcher for connecting, when the input power is low voltage, the other ends of the first and second smoothing capacitors respectively to the negative output terminal and the positive output terminal of the input rectifier and for connecting, when the input power is high voltage, the other ends of the first and second smoothing capacitors directly; two switching elements for the inverter, which are connected in series between the positive output terminal and the negative output terminal of the input rectifier and switched alternately; two capacitors, connected in series between the positive output terminal and the negative output terminal of the input rectifier, for removing a DC component and supplying power to the inverter; and an output transformer in which a primary winding is provided between a connection point between the two switching elements and a connection point between the two capacitors for removing a DC component and supplying power to the inverter and a load is connected to a secondary winding.

For example, as disclosed in Japanese Unexamined Patent Publication No. 2005-243742, there has been known a printed circuit board including: a plurality of wiring portions including at least one pair of electrodes constituting a capacitor and facing against each other and terminals for connecting the electrodes; and a switching unit for selectively switching connections between the terminals of the wiring portions, the printed circuit board characterized in that a predetermined capacitance is provided by selectively connecting the terminals by means of the switching unit.

For example, as disclosed in Japanese Unexamined Patent Publication No. H10-295081, there has been known a voltage dividing circuit for series capacitors, characterized in that it is configured that a collector of an NPN transistor is connected, via a first resistor, to an positive electrode of a first capacitor; an emitter of the NPN transistor is connected to a negative electrode of the first capacitor; a second resistor is connected between the positive electrode of the first capacitor and a base of the NPN transistor; a collector of a PNP transistor is connected, via a third resistor, a negative electrode of a second capacitor; an emitter of the PNP transistor is connected to an positive electrode of the second capacitor; a fourth resistor is connected between the negative electrode of the second capacitor and a base of the PNP transistor; the emitter of the NPN transistor is connected to the emitter of the PNP transistor; and the base of the NPN transistor is connected to the base of the PNP transistor.

SUMMARY OF INVENTION

A change-over component for switching a connection relation between two capacitor groups consisting of a plurality of capacitors connected in parallel, which is employed for individually constructing motor drive apparatuses for use in low AC supply voltage and high AC supply voltage, is often constructed from a bus bar because large current flows therethrough. The bus bar consists of metal such as, for example, copper, brass, or aluminum, and is manufactured by sheet-metal processing. However, sheet-metal processing requires high cost for a mold, leading to increase in the production cost of a motor drive apparatus. In addition, since a change-over component is required to be provided for each of the motor drive apparatuses for use in low AC supply voltage and high AC supply voltage, sufficient quantities of different types of change-over components must be in stock while in production, which makes production management complicated. Therefore, it is desired to realize a power conversion apparatus and a motor drive apparatus with ease of manufacture at low cost, which can support low AC supply voltage and high AC supply voltage.

According to one aspect of the present disclosure, a power conversion apparatus includes: an inverter unit configured to convert an input DC voltage into an AC voltage and outputting the AC voltage; a first capacitor group consisting of one capacitor or a plurality of capacitors connected in parallel to each other, an positive electrode of the first capacitor group electrically connected to an positive electrode on the DC input side of the inverter unit; a second capacitor group consisting of one capacitor or a plurality of capacitors connected in parallel to each other, a negative electrode of the second capacitor group electrically connected to a negative electrode of the DC input side of the inverter unit; a first terminal portion electrically connected to the positive electrode of the first capacitor group; a second terminal portion electrically connected to a negative electrode of the first capacitor group; a third terminal portion electrically connected to an positive electrode of the second capacitor group; and a fourth terminal portion electrically connected to the negative electrode of the second capacitor group, wherein a distance between the first terminal portion and the third terminal portion is approximately equal to a distance between the second terminal portion and the fourth terminal portion.

In addition, according to one aspect of the present disclosure, a motor drive apparatus includes: a rectifier for converting an AC voltage input from an AC power supply into a DC voltage and outputting the DC voltage; and the aforementioned power conversion apparatus connected to the rectifier for converting the DC voltage input from the rectifier into an AC voltage for driving a motor and outputting the AC voltage.

BRIEF DESCRIPTION OF THE DRAWINGS

The present invention will be more clearly understood with reference to the following accompanying drawings:

FIG. 5 is an external view exemplifying the power conversion apparatus according to the first embodiment of the present disclosure;

DETAILED DESCRIPTION

Figure 1A:
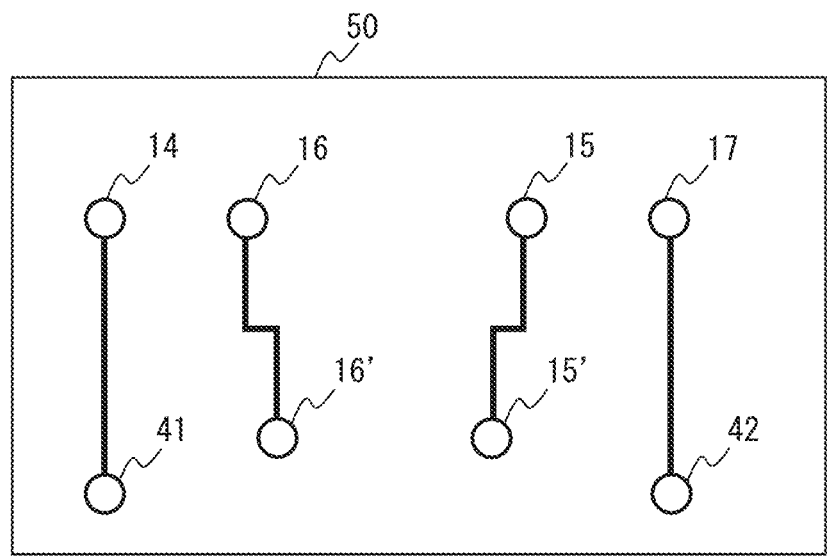
FIG. 1A is a diagram illustrating a power conversion apparatus according to a first embodiment of the present disclosure, and represents a front view exemplifying an arrangement of first to fourth terminal portions in the power conversion apparatus.

With reference to the drawings, a power conversion apparatus having two DC voltage modes and a motor drive apparatus will be described below. To facilitate understanding, these drawings use different scales as appropriate. Embodiments illustrated in the drawings are examples for implementing the present disclosure, and the present disclosure is not limited to the illustrated embodiment. Note that, in order to make description brief and to the point, an expression "electrically connecting" individual elements may be represented just as "connecting."

Figure 1B:
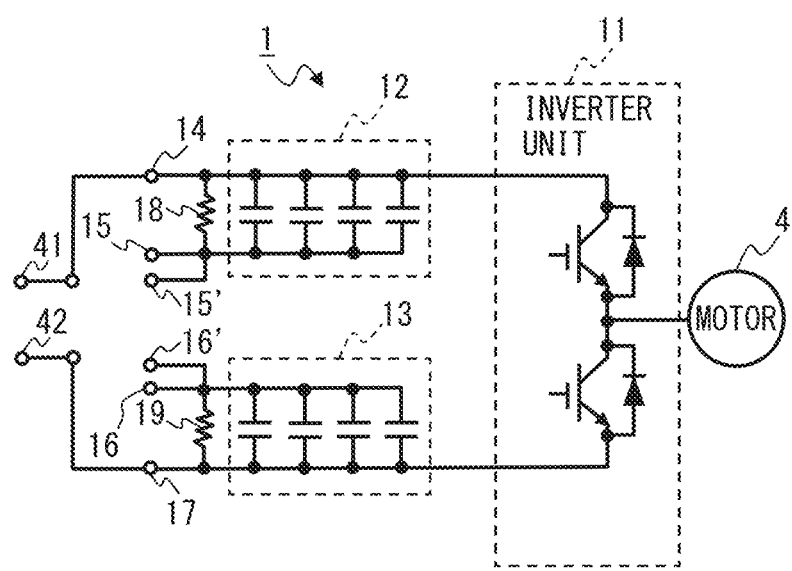
FIG. 1B is a diagram illustrating the power conversion apparatus according to the first embodiment of the present disclosure, and represents a circuit diagram of the power conversion apparatus.

FIG. 1A is a diagram illustrating a power conversion apparatus according to a first embodiment of the present disclosure, and represents a front view exemplifying an arrangement of first to fourth terminal portions in the power conversion apparatus. FIG. 1B is a diagram illustrating the power conversion apparatus according to the first embodiment of the present disclosure, and represents a circuit diagram of the power conversion apparatus. Hereinafter, the same reference numerals in different drawings denote components having the same functions.

A power conversion apparatus 1 according to the first embodiment of the present disclosure includes an inverter unit 11, a first capacitor group 12, a second capacitor group 13, a first terminal portion 14, second terminal portions 15 and 15', third terminal portions 16 and 16', a fourth terminal portion 17, a first resistor 18, and a second resistor 19. The power conversion apparatus 1 also includes a DC positive terminal 41 and a DC negative terminal 42 on the DC input side.

The inverter unit 11 converts an input DC voltage into an AC voltage and outputs the AC voltage. In other words, the inverter unit 11 converts, in response to on/off control of an individual switching elements in accordance with a switching command received from an inverter control unit (not illustrated), a DC voltage applied between an positive electrode and a negative electrode on the DC side of the inverter unit 11 into an AC voltage, and outputs the AC voltage between terminals on the AC side of the inverter unit 11. The inverter unit 11 can also convert, in response to on/off control of the individual switching elements in accordance with a switching command received from the inverter control unit, an AC voltage applied between the terminals on the AC side of the inverter unit 11 into a DC voltage, and outputs the DC voltage between the positive electrode and the negative electrode on the DC side of the inverter unit 11.

The inverter control unit (not illustrated) may be constructed, for example, in a software program form or from a combination of various types of electronic circuits and a software program. When these units are constructed, for example, in a software program form, functions of the respective units described above may be achieved by operating an arithmetic processing unit in a DSP, an FPGA, or the like in accordance with the software program. Alternatively, the inverter control unit may be constructed as a semiconductor integrated circuit into which a software program for achieving the functions of the respective units. In addition, the inverter control unit may be provided, for example, in a numerical control apparatus of a machine tool.

The inverter unit 11 is constructed from a bridge circuit including switching elements and diodes connected in antiparallel to the switching elements. When a load connected to the AC side of the inverter unit 11 is a three-phase electrical device, the inverter unit 11 is constructed as a three-phase bridge circuit in order to output a three-phase AC voltage; when the load is a single-phase electrical device, the inverter unit 11 is constructed as a single-phase bridge circuit in order to output a single-phase AC voltage. Examples of the load connected to the AC side of the inverter unit 11 include motors. Examples of the switching elements constituting the bridge circuit of the inverter unit 11 include an IGBT, a thyristor, a GTO, and a transistor although the type of the switching elements itself does not limit the present embodiment and other types of switching elements may be used.

The positive electrode and the negative electrode on the DC side of the inverter unit 11 are respectively connected to the first capacitor group 12 and the second capacitor group 13.

The first capacitor group 12 consists of one capacitor or a plurality of capacitors electrically connected in parallel to each other. An positive electrode of the first capacitor group 12 is electrically connected to the positive electrode on the DC input side of the inverter unit 11.

The second capacitor group 13 consists of one capacitor or a plurality of capacitors electrically connected in parallel to each other. A negative electrode of the second capacitor group 13 is electrically connected to the negative electrode on the DC input side of the inverter unit 11.

The first capacitor group 12 and the second capacitor group 13 have a function to store DC power used by the inverter unit 11 to output an AC voltage as well as a function to reduce, when a rectifier (not illustrated in FIG. 1A and FIG. 1B) is provided on the DC side of the power conversion apparatus 1, a pulsating component in the DC output of the rectifier. The capacitors constituting the first capacitor group 12 and the second capacitor group 13 are, for example, electrolytic capacitors although they may be film capacitors or the like as an alternative.

Note that the numbers of the capacitors constituting the first capacitor group 12 and the second capacitor group 13 do not particularly limit the present embodiment. FIG. 1A and FIG. 1B illustrate, as an example, a case where each of the first capacitor group 12 and the second capacitor group 13 consists of four capacitors connected in parallel. When each of the first capacitor group 12 and the second capacitor group 13 consists of one capacitor, they may consist of a single high capacitance capacitor.

The first resistor 18 is electrically connected in parallel to the first capacitor group 12 while one end of the first resistor 18 is electrically connected to the first terminal portion 14 to be described below.

The second resistor 19 is electrically connected in parallel to the second capacitor group 13 while one end of the second resistor 19 is electrically connected to the fourth terminal portion 17.

The first resistor 18 and the second resistor 19 have a function serving as a voltage-dividing resistor for preventing imbalance between voltages applied to the first capacitor group 12 and the second capacitor group 13 in a high DC voltage mode to be described below. Therefore, the resistance values of the first resistor 18 and that of the second resister 19 are set to an equal value.

In the production of the power conversion apparatus 1, whether the first capacitor group 12 and the second capacitor group 13 are connected in parallel or connected in series is determined by a relation between breakdown voltages of respective capacitors in the first capacitor group 12 and the second capacitor group 13 and a DC link voltage value on the DC input side of the power conversion apparatus 1. When the DC link voltage value is lower than the breakdown voltage of a single capacitor, the power conversion apparatus 1 for use in a low DC voltage mode, in which the first capacitor group 12 and the second capacitor group 13 are connected in parallel, is manufactured. When the DC link voltage value is higher than the breakdown voltage of a single capacitor, the power conversion apparatus 1 for use in the high DC voltage mode, in which the first capacitor group 12 and the second capacitor group 13 are connected in series, is manufactured. By selectively switching electrical connections among the first terminal portion 14, the second terminal portions 15 and 15', the third terminal portions 16 and 16', and the fourth terminal portion 17, the power conversion apparatus 1 for use in the low DC voltage mode and the power conversion apparatus 1 for use in the high DC voltage mode may be manufactured separately. In this manner, many components may be commonalized between the power conversion apparatus 1 for use in the low DC voltage mode and the power conversion apparatus 1 for use in the high DC voltage mode, thereby reducing the production cost and saving troubles in the production of the power conversion apparatus 1.

The first terminal portion 14 is electrically connected to the positive electrode of the first capacitor group 12. The first terminal portion 14 is also electrically connected to the DC positive terminal 41 for connecting the DC side of the power conversion apparatus 1 to an external device (for example, a rectifier). As described above, the positive electrode of the first capacitor group 12 is electrically connected to the positive electrode on the DC input side of the inverter unit 11; therefore, the DC positive terminal 41, the first terminal portion 14, and the positive electrode on the DC input side of the inverter unit 11 are at the same potential.

The second terminal portions 15 and 15' are electrically connected to a negative electrode of the first capacitor group 12. Note that, since the second terminal portion 15 and the second terminal portion 15' are at the same potential, only the second terminal portion 15 may be provided with omitting the second terminal portion 15'.

The third terminal portions 16 and 16' are electrically connected to an positive electrode of the second capacitor group 13. Note that, since the third terminal portion 16 and the third terminal portion 16' are at the same potential, only the third terminal portion 16 may be provided with omitting the third terminal portion 16'.

The fourth terminal portion 17 is electrically connected to the negative electrode of the second capacitor group 13. The fourth terminal portion 17 is also electrically connected to the DC negative terminal 42 for connecting the DC side of the power conversion apparatus 1 to an external device (for example, a rectifier). As described above, the negative electrode of the second capacitor group 13 is electrically connected to the negative electrode on the DC input side of the inverter unit 11; therefore, the DC negative terminal 42, the fourth terminal portion 17, and the negative electrode on the DC input side of the inverter unit 11 are at the same potential.

Figure 2A:
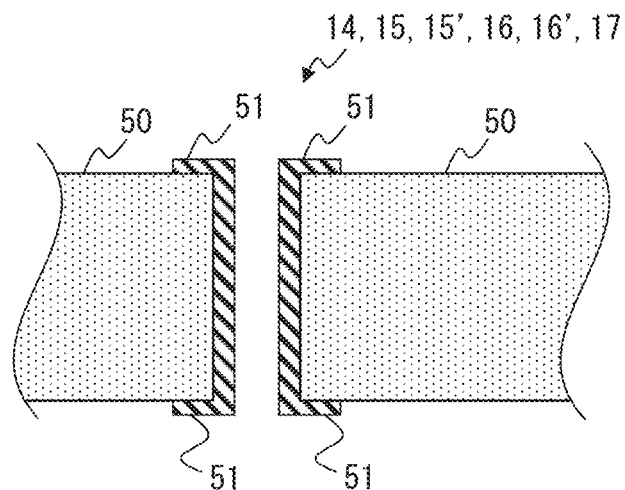
FIG. 2A is a cross-sectional view exemplifying the first to fourth terminal portions formed by lands of through holes.
Figure 2B:
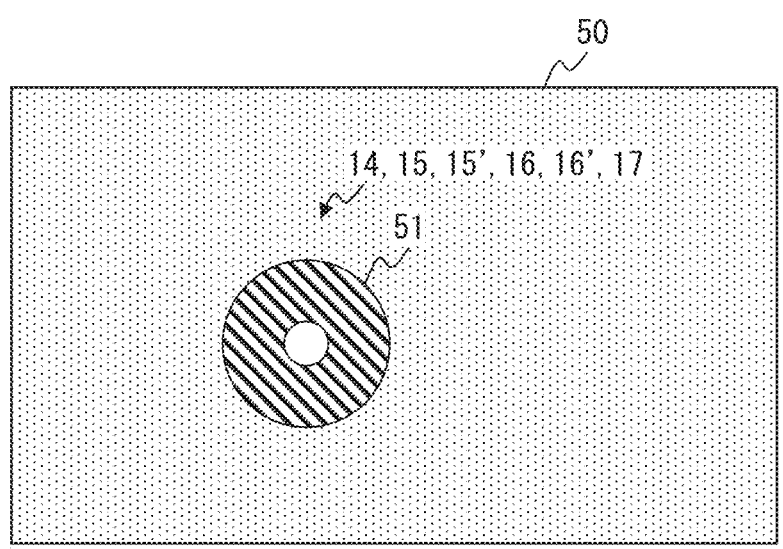
FIG. 2B is a front view exemplifying the first to fourth terminal portions formed by the lands of the through holes.

FIG. 2A is a cross-sectional view exemplifying the first to fourth terminal portions formed by lands of through holes. FIG. 2B is a front view exemplifying the first to fourth terminal portions formed by the lands of the through holes. As illustrated in FIG. 2A and FIG. 2B, each of the first terminal portion 14, the second terminal portions 15 and 15', the third terminal portions 16 and 16', and the fourth terminal portion 17 is provided, for example, as a land 51 of a through hole. The land 51 is a conductor pattern used for physically mounting and electrically connecting a component. The shape of the hole of the land 51 does not particularly limit the present embodiment, and it may be a circular hole as exemplified in FIG. 2A and FIG. 2B, an elongate hole, or a rectangle hole. The first terminal portion 14, the second terminal portions 15 and 15', the third terminal portions 16 and 16', and the fourth terminal portion 17, all of which are formed by the land 51, are provided on an insulating substrate 50, which is a printed circuit board or a molded plate.

In the first embodiment, as illustrated in FIG. 1A, a distance between the first terminal portion 14 and the third terminal portion 16 provided on the insulating substrate 50 and a distance between the second terminal portion 15 and the fourth terminal portion 17 also provided on the insulating substrate 50 are equal. These two distances may not be exactly equal, and they may be approximately equal to such an extent that a first electrical conductor 21 and a second electrical conductor 22 to be described below, which are formed to have the same length, can electrically connect the first terminal portion 14 to the third terminal portion 16 and the second terminal portion 15 to the fourth terminal portion 17, respectively. Note that distances among the first terminal portion 14, the second terminal portions 15 and 15', the third terminal portions 16 and 16', and the fourth terminal portion 17, except for the distance between the first terminal portion 14 and the third terminal portion 16 and the distance between the second terminal portion 15 and the fourth terminal portion 17, may be set to any value in the first embodiment.

On the insulating substrate 50, the first terminal portion 14 and the third terminal portion 16 may be electrically connected by the first electrical conductor 21, and the second terminal portion 15 and the fourth terminal portion 17 may be electrically connected by the second electrical conductor 22. On the insulating substrate 50, the second terminal portion 15' and the third terminal portion 16' may be electrically connected by a third electrical conductor 23. Note that, when the second terminal portion 15' and the third terminal portion 16' are omitted, the second terminal portion 15 and the third terminal portion 16 may be electrically connected by the third electrical conductor 23.

The first electrical conductor 21, the second electrical conductor 22, and the third electrical conductor 23 are change-over components for selectively switching the connection relation between the first capacitor group 12 and the second capacitor group 13 in the power conversion apparatus 1. Each of the first electrical conductor 21, the second electrical conductor 22, and the third electrical conductor 23 is, for example, a bus bar, a conductive cable, or a conductive member with an insulating coating, the outer periphery of which is covered by the insulating coating, or the like. The bus bar and the conductive cable are conductors for conducting large current, and they are manufactured by sheet-metal processing of metal such as copper, brass, or aluminum. With respect to the conductive member with an insulating coating, the conductive member portion thereof is also for a conductor for conducting large current, and the portion is manufactured by sheet-metal processing of metal such as copper, brass, or aluminum. In particular, when each of the first electrical conductor 21, the second electrical conductor 22, and the third electrical conductor 23 is constructed from the conductive member with an insulating coating, the insulating coating is peeled off at a portion of the conductive member with the insulating coating for connecting to each terminal portion, thereby exposing the conductive member to the outside. The conductive cable or the conductive member with an insulating coating may have high rigidity or high flexibility. In embodiments to be described below, a case where each of the first electrical conductor 21, the second electrical conductor 22, and the third electrical conductor 23 is constructed from a bus bar will be described as an example.

In the first embodiment, the distance between the first terminal portion 14 and the third terminal portion 16 and the distance between the second terminal portion 15 and the fourth terminal portion 17 are approximately equal; therefore, the first electrical conductor 21 and the second electrical conductor 22 are manufactured by sheet-metal processing using the same mold so that the lengths of these electrical conductors are equal. Thus, according to the first embodiment, only two types of change-over components in total, i.e., a change-over component serving as the first electrical conductor 21 and the second electrical conductor 22 and a change-over component serving as the third electrical conductor 23 are preferably manufactured by sheet-metal processing. In this manner, the first electrical conductor 21 and the second electrical conductor 22 may be manufactured as a common change-over component; as a result, the number of types of the change-over components may be reduced.

By switching electrical connection relations between the first terminal portion 14 and the third terminal portion 16, between the second terminal portion 15 and the fourth terminal portion 17, and between the second terminal portion 15' and the third terminal portion 16' using the first electrical conductor 21, the second electrical conductor 22, and the third electrical conductor 23, the connection relation between the first capacitor group 12 and the second capacitor group 13 in the power conversion apparatus 1 may be selectively switched. Note that, when the second terminal portion 15' and the third terminal portion 16' are omitted, by switching electrical connection relations between the first terminal portion 14 and the third terminal portion 16, between the second terminal portion 15 and the fourth terminal portion 17, and between the second terminal portion 15 and the third terminal portion 16 using the first electrical conductor 21, the second electrical conductor 22, and the third electrical conductor 23, the connection relation between the first capacitor group 12 and the second capacitor group 13 in the power conversion apparatus 1 may be selectively switched.

Figure 3A:
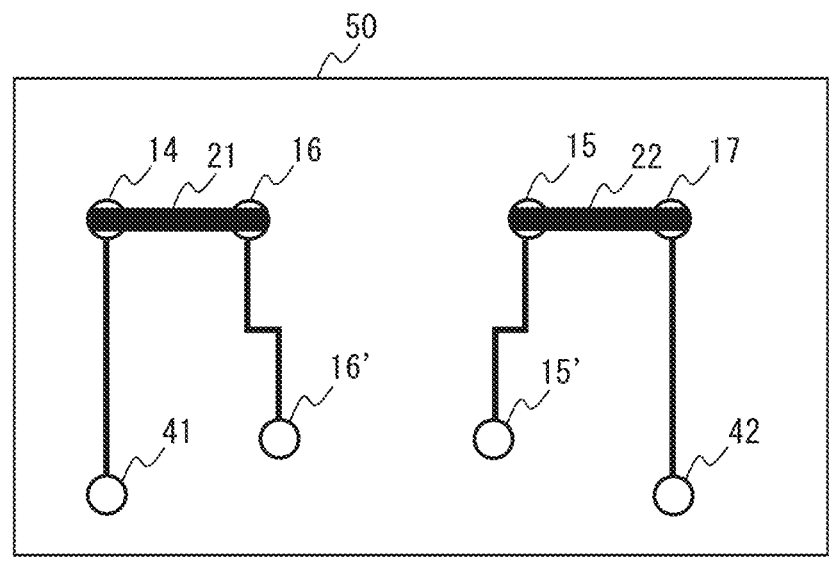
FIG. 3A is a diagram illustrating the power conversion apparatus according to the first embodiment of the present disclosure in a low DC voltage mode, and represents a front view illustrating an example of setting of a first electrical conductor and a second electrical conductor.
Figure 3B:
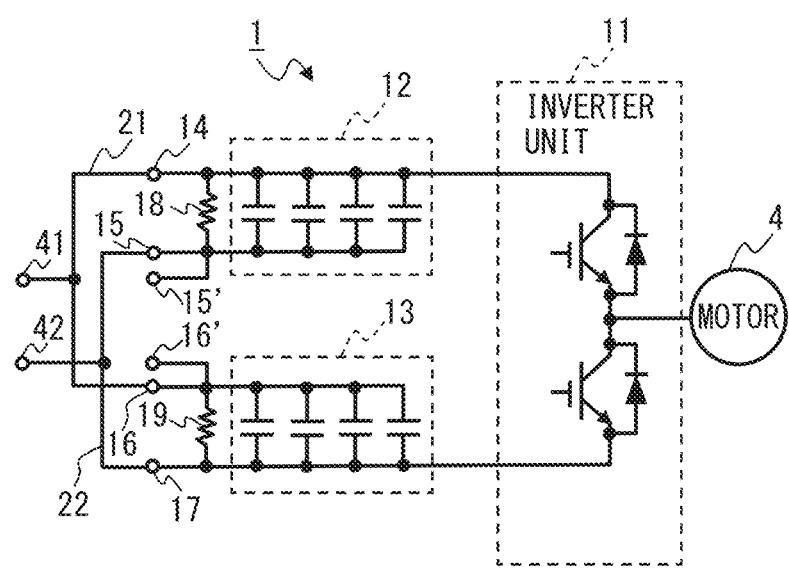
FIG. 3B is a circuit diagram of the power conversion apparatus according to the first embodiment of the present disclosure in the low DC voltage mode.

FIG. 3A is a diagram illustrating the power conversion apparatus according to the first embodiment of the present disclosure in the low DC voltage mode, and represents a front view illustrating an example of setting of the first electrical conductor and the second electrical conductor. FIG. 3B is a circuit diagram of the power conversion apparatus according to the first embodiment of the present disclosure in the low DC voltage mode.

When a rectifier (not illustrated) connected to the DC side of the power conversion apparatus 1 is connected to a low-voltage AC power supply, the DC link voltage in the power conversion apparatus 1, which is a DC voltage input to the inverter unit 11, is also a low voltage (e.g., 200 V). When it is assumed that the power conversion apparatus 1 will be used in an environment where the DC link voltage value is higher than the breakdown voltage of a single capacitor, the electrical connections for the low DC voltage mode as illustrated in FIG. 3A and FIG. 3B are made in the production of the power conversion apparatus 1. In other words, in the low DC voltage mode, the first terminal portion 14 and the third terminal portion 16 are electrically connected by the first electrical conductor 21, and the second terminal portion 15 and the fourth terminal portion 17 are electrically connected by the second electrical conductor 22. For the sake of convenience, the electrical conductors connecting the first terminal portion 14 to the third terminal portion 16 and the second terminal portion 15 to the fourth terminal portion 17 were respectively denoted as "first" and "second." However, as described above, the distance between the first terminal portion 14 and the third terminal portion 16 and the distance between the second terminal portion 15 and the fourth terminal portion 17 are approximately equal; therefore, the first electrical conductor 21 and the second electrical conductor 22 are electrical conductors having the same shape.

As illustrated in FIG. 3B, in the low DC voltage mode, the first terminal portion 14 and the third terminal portion 16 are electrically connected, and the second terminal portion 15 and the fourth terminal portion 17 are electrically connected; therefore, the first capacitor group 12 and the second capacitor group 13 are electrically in a parallel-connected state. In other words, in the power conversion apparatus 1 in the low DC voltage mode, eight capacitors connected in parallel function as a smoothing capacitor (DC link capacitor). Note that, since a DC voltage that appears between the DC positive terminal 41 and the DC negative terminal 42 is applied to these eight capacitors connected in parallel, the first resistor 18 and the second resistor 19 do not exert the function serving as a voltage-dividing resistor. When the DC voltage that appears between the DC positive terminal 41 and the DC negative terminal 42 is, for example, 200 V, 200 V is applied to each capacitor of the first capacitor group 12 and the second capacitor group 13.

Figure 4A:
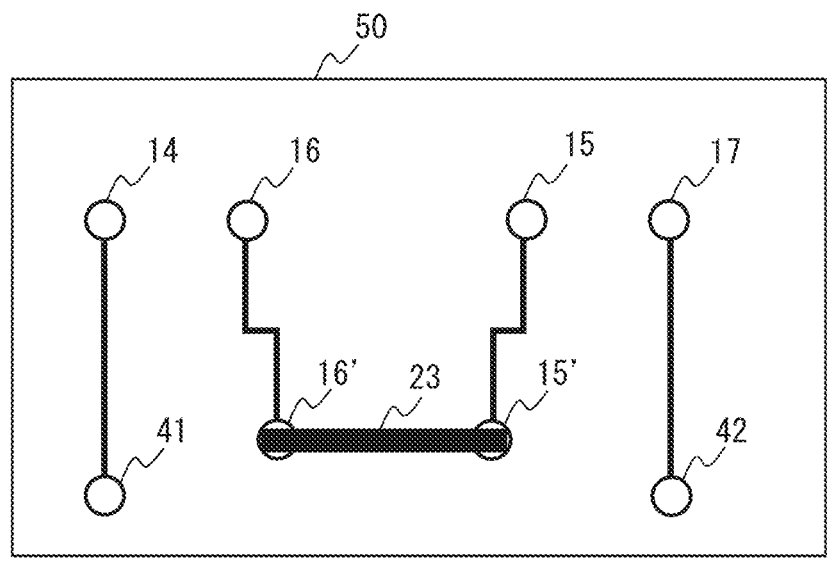
FIG. 4A is a diagram illustrating the power conversion apparatus according to the first embodiment of the present disclosure in a high DC voltage mode, and represents a front view illustrating an example of setting of a third electrical conductor.
Figure 4B:
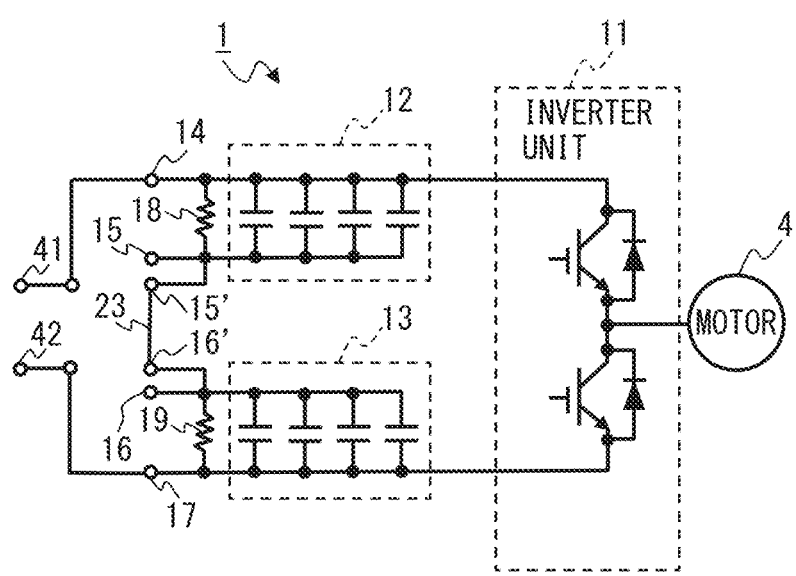
FIG. 4B is a circuit diagram of the power conversion apparatus according to the first embodiment of the present disclosure in the high DC voltage mode.

FIG. 4A is a diagram illustrating the power conversion apparatus according to the first embodiment of the present disclosure in the high DC voltage mode, and represents a front view illustrating an example of setting of the third electrical conductor. FIG. 4B is a diagram illustrating the power conversion apparatus according to the first embodiment of the present disclosure in the high DC voltage mode, and represents the circuit diagram of the power conversion apparatus.

When a rectifier (not illustrated) connected to the DC side of the power conversion apparatus 1 is connected to a high-voltage AC power supply, the DC link voltage in the power conversion apparatus 1, which is a DC voltage input to the inverter unit 11, is also a high voltage (e.g., 400 V). When it is assumed that the power conversion apparatus 1 will be used in an environment where the DC link voltage value is lower than the breakdown voltage of a single capacitor, the electrical connections for the high DC voltage mode as illustrated in FIG. 4A and FIG. 4B are made in the production of the power conversion apparatus 1. In other words, in the high DC voltage mode, the second terminal portion 15' and the third terminal portion 16' are electrically connected by the third electrical conductor 23. Note that, when the second terminal portion 15' and the third terminal portion 16' are omitted and only the second terminal portion 15 and the third terminal portion 16 are provided, in the high DC voltage mode, the second terminal portion 15 and the third terminal portion 16 are electrically connected by the third electrical conductor 23.

As illustrated in FIG. 4B, in the high DC voltage mode, the second terminal portion 15' and the third terminal portion 16' are electrically connected by the third electrical conductor 23; therefore, the first capacitor group 12 and the second capacitor group 13 are in a series-connected state. In other words, in the power conversion apparatus 1 in the high DC voltage mode, the first capacitor group 12 and the second capacitor group 13, which are connected in series with each other, function as a smoothing capacitor (DC link capacitor). As described above, the first resistor 18 and the second resistor 19 having the same resistance value are respectively connected in parallel to the first capacitor group 12 and to the second capacitor group 13. Thus, the voltage applied between the DC positive terminal 41 and the DC negative terminal 42 is divided by the first resistor 18 and the second resistor 19, and a voltage having an equal magnitude is applied to each of the first capacitor group 12 and the second capacitor group 13. When the DC voltage that appears between the DC positive terminal 41 and the DC negative terminal 42 is, for example, 400 V, 200 V is applied to each capacitor of the first capacitor group 12 and 200 V is applied to each capacitor of the second capacitor group 13. In this manner, according to the high DC voltage mode illustrated in FIG. 4A and FIG. 4B, by electrically connecting the second terminal portion 15' (or 15) and the third terminal portion 16' (or 16) by the third electrical conductor 23, the first capacitor group 12 and the second capacitor group 13 are connected in series, enabling the power conversion apparatus 1 to support input of a DC voltage higher than in the low DC voltage mode illustrated in FIG. 3A and FIG. 3B.

FIG. 5 is an external view exemplifying the power conversion apparatus according to the first embodiment of the present disclosure.

As exemplified in FIG. 5, there are provided on the insulating substrate 50, which constitutes one side of an enclosure of the power conversion apparatus 1, the first terminal portion 14, the second terminal portions 15 and 15', the third terminal portions 16 and 16', the fourth terminal portion 17, the first resistor 18, the second resistor 19, and the DC positive terminal 41 and the DC negative terminal 42 on the DC input side. Note that, in FIG. 5, in order to make description brief and to the point, both of the low DC voltage mode, which is realized by connection by the first electrical conductor 21 and the second electrical conductor 22, and the high DC voltage mode, which is realized by connection by the third electrical conductor 23, are illustrated; in reality, however, either one of these DC voltage modes is selected.

As described above, according to the first embodiment, when the power conversion apparatus 1 for use in the low DC voltage mode is manufactured, the first terminal portion 14 and the third terminal portion 16 are electrically connected by the first electrical conductor 21, and the second terminal portion 15 and the fourth terminal portion 17 are electrically connected by the second electrical conductor 22. As described above, the first electrical conductor 21 and the second electrical conductor 22 are change-over components having the same shape. When the power conversion apparatus 1 for use in the high DC voltage mode is manufactured, the second terminal portion 15' and the third terminal portion 16' are electrically connected by the third electrical conductor 23. In this manner, by switching electrical connection relations between the first terminal portion 14 and the third terminal portion 16, between the second terminal portion 15 and the fourth terminal portion 17, and between the second terminal portion 15' and the third terminal portion 16' using the first electrical conductor 21, the second electrical conductor 22, and the third electrical conductor 23, the connection relation between the first capacitor group 12 and the second capacitor group 13 in the power conversion apparatus 1 may be selectively switched.

Figure 6:
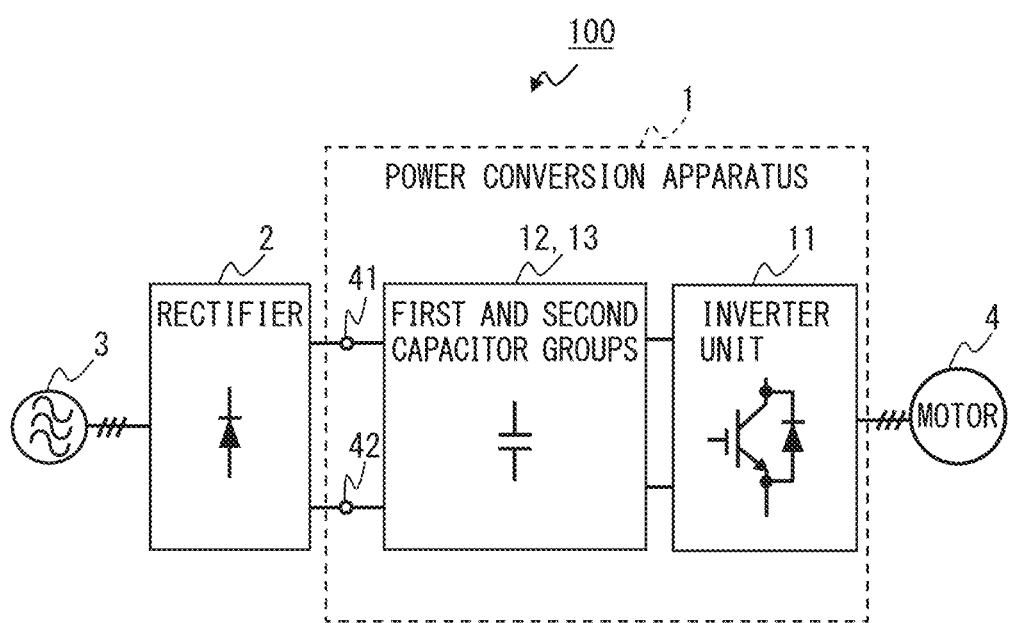
FIG. 6 is a diagram illustrating a motor drive apparatus including the power conversion apparatus according to the first to fourth embodiments of the present disclosure.

FIG. 6 is a diagram illustrating a motor drive apparatus including the power conversion apparatus according to the first to fourth embodiments of the present disclosure. Note that, in FIG. 6, in order to make drawings concise, a three-phase wiring associated with an AC power supply 3 and a motor 4 is represented, in accordance with convention, by a combination of "-", which represents one wiring "-", and three slanting lines "///".

By providing the power conversion apparatus 1 according to the aforementioned first embodiment, or a second or third embodiment to be described below in the motor drive apparatus 100, a motor drive apparatus 100 that can support each of low AC supply voltage and high AC supply voltage can be manufactured easily and at low cost. Although a case where the motor drive apparatus 100 is provided with the power conversion apparatus 1 according to the aforementioned first embodiment will be described here, the same description holds even when the power conversion apparatus according to the second or third embodiment to be described below is provided.

The motor drive apparatus 100 includes the power conversion apparatus 1 including a rectifier 2 and the inverter unit 11.

To the AC side of the rectifier 2, an AC power supply 3 is connected. The number of phases of the AC power supply 3 does not particularly limit the present embodiment, and the number of phases may be, for example, three phases or a single phase. In the illustrated example, the AC power supply 3 is three-phase. Examples of the AC power supply include a three-phase 400 V AC power supply, a three-phase 200 V AC power supply, a three-phase 600 V AC power supply, and a single-phase 100 V AC power supply.

To the DC side of the rectifier 2, the DC positive terminal 41 and the DC negative terminal 42 of the power conversion apparatus 1 are connected. In the power conversion apparatus 1 which has the DC positive terminal 41 and the DC negative terminal 42 as the DC input terminals, the connection relation between the first capacitor group 12 and the second capacitor group 13 may be selectively switched. These capacitor groups, i.e., the first capacitor group 12 and the second capacitor group 13, reduce a pulsating component of a DC voltage output by the rectifier 2 and function as a so-called DC link capacitor, which stores DC power used by the inverter unit 11 for outputting an AC voltage.

The rectifier 2 converts an AC voltage input from the AC power supply 3 into a DC voltage and outputs the DC voltage. Examples of the rectifier 2 include a diode rectifier circuit, a 120-degree conduction type rectifier circuit, and a PWM converter including switching elements inside. In the example illustrated in FIG. 6, since the AC power supply 3 is three-phase, the rectifier 2 is constructed as a three-phase bridge circuit. When the AC power supply 3 is single-phase, the rectifier 2 is constructed as a single-phase bridge circuit. When the rectifier 2 is a 120-degree conduction type rectifier circuit or a PWM converter, the rectifier 2 not only converts an AC voltage input from the AC power supply 3 into a DC power and outputs the DC power, but also converts, during regeneration of the power supply, a DC voltage input from the DC side into an AC voltage and outputs the AC voltage to the AC power supply 3. When the rectifier 2 is a PWM converter, the rectifier 2 is constructed from a bridge circuit including switching elements and diodes connected in antiparallel to the switching elements. In this case, examples of the switching elements include a FET, an IGBT, a thyristor, a GTO, an SiC, and a transistor although the type of the switching element itself does not limit the present embodiment and other types of switching elements may be used. Note that an AC reactor, an AC line filter and the like are provided on the AC input side of the rectifier 2, but they are omitted in the illustration.

To the AC side of the power conversion apparatus 1 including the inverter unit 11, the motor 4 is connected. In the present embodiment, a type of the motor 4 is not particularly limited, and it may be an induction motor or a synchronous motor. The number of phases of the motor 4 does not particularly limit the present embodiment, and it may be, for example, three phases or a single phase. In the illustrated example, the motor 4 is three-phase. Examples of machinery provided with the motor 4 include, for example, a machine tool, a robot, forging machinery, an injection molding machine, industrial machinery, various types of electrical appliances, trains, automobiles, and airplanes.

The power conversion apparatus 1 converts a DC voltage input from the rectifier 2 via the DC positive terminal 41 and the DC negative terminal 42 into an AC voltage for driving the motor 4 and outputs the AC voltage between the terminals on the AC side. The process of converting the DC voltage into the AC voltage is performed by the inverter unit 11 of the power conversion apparatus 1. The inverter unit 11 is controlled, similarly to a common motor drive apparatus, by the aforementioned inverter control unit (not illustrated). In other words, the inverter control unit generates, on the basis of an actual speed of the motor 4 detected by a speed sensor (speed feedback), a current flowing through a winding of the motor 4 (current feedback), a predetermined torque command, a program for operating the motor 4, or the like, a voltage command for controlling speed and torque of the motor 4 or a position of a rotor, for example, by means of the PWM control method. In accordance with the voltage command generated by the inverter control unit, the voltage conversion operation is controlled by the inverter unit 11, and as a result, the driving of the motor 4 is controlled. The inverter control unit can achieve, for example, by operating an arithmetic processing unit in a DSP, an FPGA, or the like in the motor drive apparatus 100 in accordance with the software program, the aforementioned functions.

In the power conversion apparatus 1, the low DC voltage mode is achieved by connecting the first capacitor group 12 and the second capacitor group 13 in parallel using the first electrical conductor 21 and the second electrical conductor 22 while the high DC voltage mode is achieved by connecting the first capacitor group 12 and the second capacitor group 13 in series using the third electrical conductor 23. Thus, by providing the power conversion apparatus 1 in the motor drive apparatus 100, the motor drive apparatus 100 that can support each of low AC supply voltage and high AC supply voltage can be manufactured easily and at low cost.

Figure 7A:
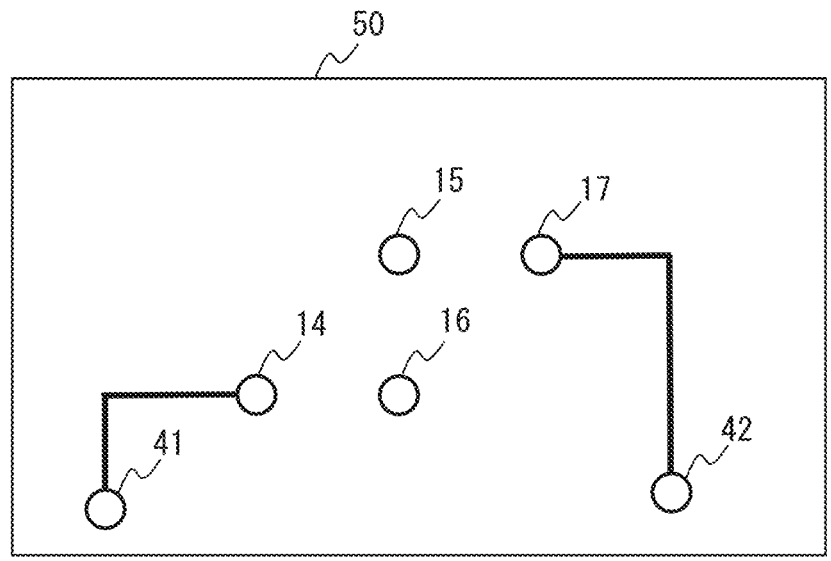
FIG. 7A is a diagram illustrating a power conversion apparatus according to a second embodiment of the present disclosure, and represents a front view exemplifying an arrangement of first to fourth terminal portions in the power conversion apparatus.
Figure 7B:
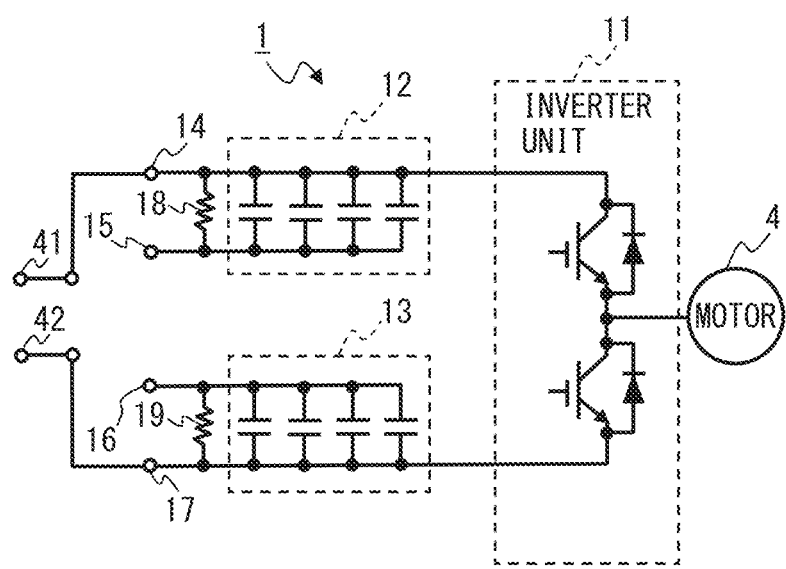
FIG. 7B is a circuit diagram of the power conversion apparatus according to the second embodiment of the present disclosure.

Next, the second embodiment of the present disclosure will be described. FIG. 7A is a diagram illustrating a power conversion apparatus according to the second embodiment of the present disclosure, and represents a front view exemplifying an arrangement of the first to fourth terminal portions in the power conversion apparatus. FIG. 7B is a circuit diagram of the power conversion apparatus according to the second embodiment of the present disclosure.

The second embodiment is defined by additionally setting, in the first embodiment, a distance between the second terminal portion 15 and the third terminal portion 16 to be approximately equal to the distance between the first terminal portion 14 and the third terminal portion 16 and the distance between the second terminal portion 15 and the fourth terminal portion 17.

In other words, in the power conversion apparatus 1 according to the second embodiment of the present disclosure, it is configured that the distance between the first terminal portion 14 and the third terminal portion 16, the distance between the second terminal portion 15 and the fourth terminal portion 17, and the distance between the second terminal portion 15 and the third terminal portion 16 are approximately equal. These three distances may not be exactly equal, and they may be approximately equal to such an extent that the first electrical conductor 21, the second electrical conductor 22, and the third electrical conductor 23, which are formed to have the same length, can electrically connect the first terminal portion 14 to the third terminal portion 16, the second terminal portion 15 to the fourth terminal portion 17, and the second terminal portion 15 to the third terminal portion 16, respectively. Note that distances among the first terminal portion 14, the second terminal portions 15 and 15', the third terminal portions 16 and 16', and the fourth terminal portion 17, except for "the distance between the first terminal portion 14 and the third terminal portions 16, the distance between the second terminal portion 15 and the fourth terminal portion 17, and the distance between the second terminal portion 15 and the fourth terminal portion 17", may be set to any value.

In the second embodiment, the distance between the first terminal portion 14 and the third terminal portion 16, the distance between the second terminal portion 15 and the fourth terminal portion 17, and the distance between the second terminal portion 15 and the third terminal portion 16 are approximately equal; therefore, the first electrical conductor 21, the second electrical conductor 22, and the third electrical conductor 23 are manufactured by sheet-metal processing using the same mold so that the lengths of these electrical conductors are equal. In this manner, according to the second embodiment, the first electrical conductor 21, the second electrical conductor 22, and the third electrical conductor 23 may be manufactured as a common change-over component, and the number of types of the change-over components may be further reduced than in the first embodiment.

As described above, according to the second embodiment, by switching electrical connection relations between the first terminal portion 14 and the third terminal portion 16, between the second terminal portion 15 and the fourth terminal portion 17, and between the second terminal portion 15 and the third terminal portion 16 using the first electrical conductor 21, the second electrical conductor 22, and the third electrical conductor 23 manufactured by the same sheet-metal processing, the connection relation between the first capacitor group 12 and the second capacitor group 13 in the power conversion apparatus 1 may be selectively switched.

Except for the distances among the terminal portions, the respective configurations of the inverter unit 11, the first capacitor group 12, the second capacitor group 13, the first electrical conductor 21, the second electrical conductor 22, and the third electrical conductor 23 and connection relations among those individual components are similar to those in the first embodiment.

Figure 8A:
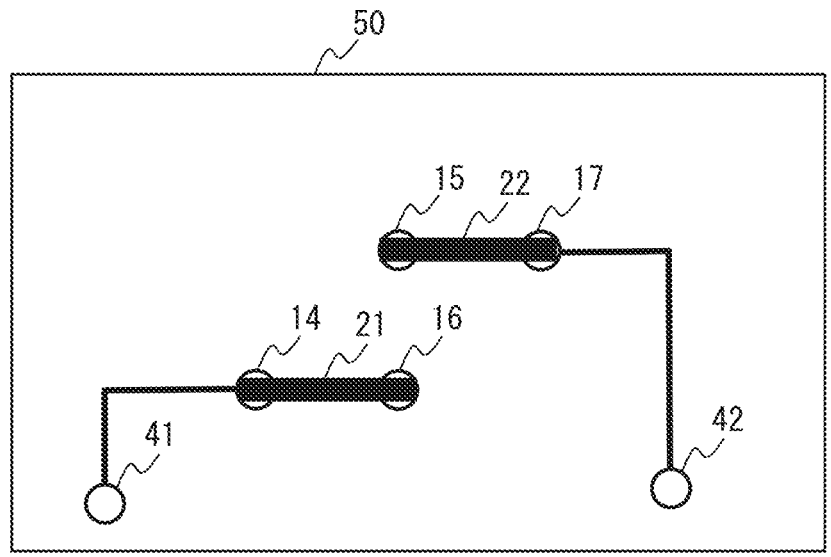
FIG. 8A is a front view illustrating an example of setting of first to third electrical conductors in the power conversion apparatus according to the second embodiment of the present disclosure, and illustrates the example of setting of the first to third electrical conductors in the low DC voltage mode.
Figure 8B:
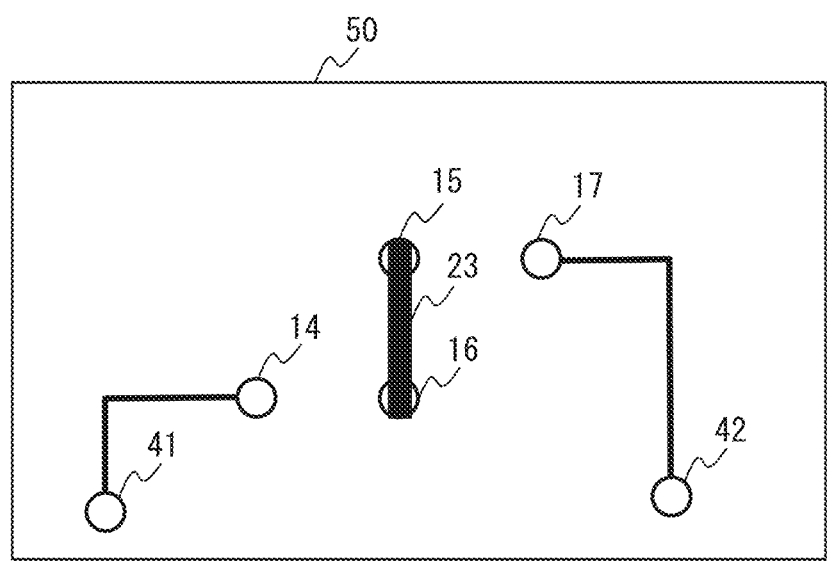
FIG. 8B is a front view illustrating an example of setting of the first to third electrical conductors in the power conversion apparatus according to the second embodiment of the present disclosure, and illustrates the example of setting of the first to third electrical conductors in the high DC voltage mode.

FIG. 8A is a front view illustrating an example of setting of the first to third electrical conductors in the power conversion apparatus according to the second embodiment of the present disclosure, and illustrates the example of setting of the first to third electrical conductors in the low DC voltage mode. FIG. 8B is a front view illustrating an example of setting of the first to third electrical conductors in the power conversion apparatus according to the second embodiment of the present disclosure, and illustrates the example of setting of the first to third electrical conductors in the high DC voltage mode.

When the power conversion apparatus 1 for use in the low DC voltage mode is manufactured, as illustrated in FIG. 8A, the first terminal portion 14 and the third terminal portion 16 are electrically connected by the first electrical conductor 21, and the second terminal portion 15 and the fourth terminal portion 17 are electrically connected by the second electrical conductor 22. In this manner, the first capacitor group 12 and the second capacitor group 13 illustrated in FIG. 7B are connected in parallel.

When the power conversion apparatus 1 for use in the high DC voltage mode is manufactured, as illustrated in FIG. 8B, the second terminal portion 15 and the third terminal portion 16 are electrically connected by the third electrical conductor 23. In this manner, the first capacitor group 12 and the second capacitor group 13 illustrated in FIG. 7B are connected in series.

As described above, in the second embodiment, the distance between the first terminal portion 14 and the third terminal portion 16, the distance between the second terminal portion 15 and the fourth terminal portion 17, and the distance between the second terminal portion 15 and the third terminal portion 16 are approximately equal; therefore, change-over components formed of an electrical conductor having the same shape (i.e., the first electrical conductor 21, the second electrical conductor 22, and the third electrical conductor 23) may be used for connection among these terminal portions.

Figure 9A:
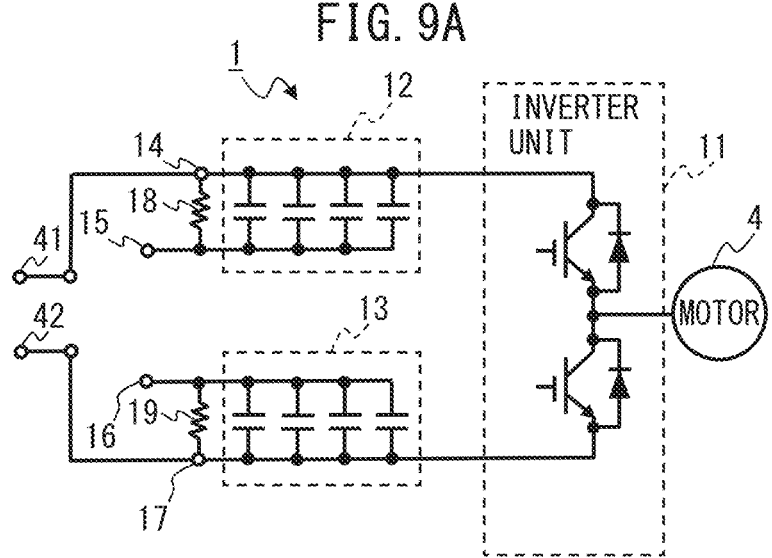
FIG. 9A is a circuit diagram illustrating a power conversion apparatus according to a third embodiment of the present disclosure, and illustrates the power conversion apparatus when an electrical conductor is not connected thereto.
Figure 9B:
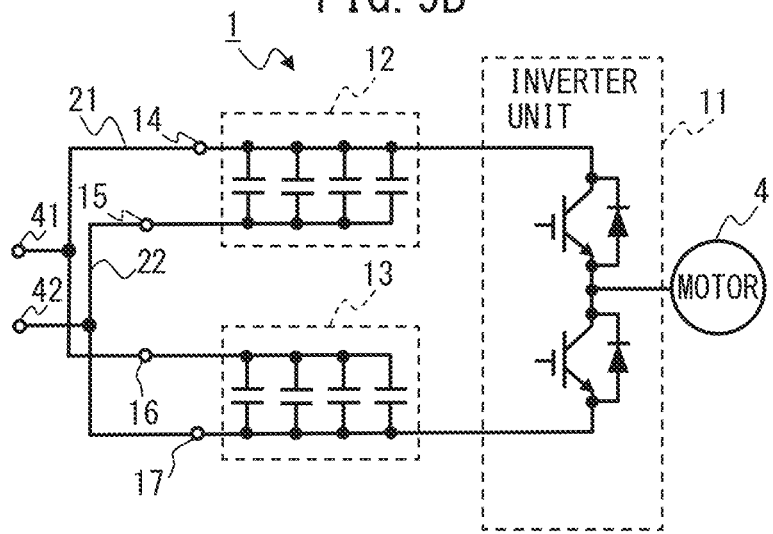
FIG. 9B is a circuit diagram illustrating the power conversion apparatus according to the third embodiment of the present disclosure, and illustrates the power conversion apparatus in the low DC voltage mode.
Figure 9C:
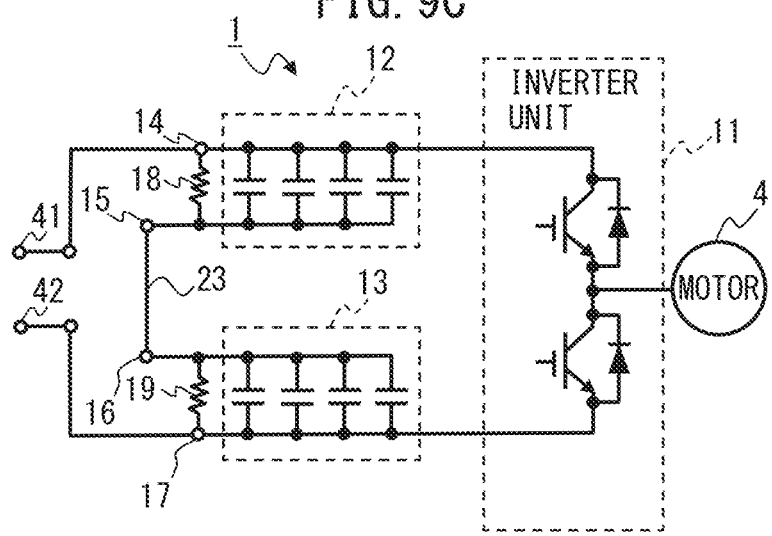
FIG. 9C is a circuit diagram illustrating the power conversion apparatus according to the third embodiment of the present disclosure, and illustrates the power conversion apparatus in the high DC voltage mode.

Next, the third embodiment of the present disclosure will be described. FIG. 9A is a circuit diagram illustrating the power conversion apparatus according to the third embodiment of the present disclosure, and illustrates the power conversion apparatus when an electrical conductor is not connected. FIG. 9B is a circuit diagram illustrating the power conversion apparatus according to the third embodiment of the present disclosure, and illustrates the power conversion apparatus in the low DC voltage mode. FIG. 9C is a circuit diagram illustrating the power conversion apparatus according to the third embodiment of the present disclosure, and illustrates the power conversion apparatus in the high DC voltage mode.

In the third embodiment, the first resistor 18 and the second resistor 19 in the first embodiment or the second embodiment are not mounted in the power conversion apparatus 1 for use in the low DC voltage mode while they are mounted in the power conversion apparatus 1 for use in the high DC voltage mode.

As described above, the first resistor 18 and the second resistor 19 have a function serving as a voltage-dividing resistor for preventing imbalance between voltages applied to the first capacitor group 12 and the second capacitor group 13, which are connected in series in the high DC voltage mode. In contrast, in the low DC voltage mode, since the first capacitor group 12 and the second capacitor group 13 are connected in parallel, the voltage applied to the first capacitor group 12 and the voltage applied to the second capacitor group 13 are equal in magnitude; therefore, the first resistor 18 and the second resistor 19 do not exert the function serving as a voltage-dividing resistor. Accordingly, in the third embodiment, when the power conversion apparatus 1 for use in the low DC voltage mode is manufactured, mounting of the first resistor 18 and the second resistor 19 is omitted while the power conversion apparatus 1 for use in the high DC voltage mode is manufactured, the first resistor 18 and the second resistor 19 are mounted. In general, the insulating substrate is provided with lands for connecting the first resistor 18 and the second resistor 19; in the third embodiment, the lands, which are not used in the low DC voltage mode because the first resistor 18 and the second resistor 19 are not mounted, are made good use of as the first terminal portion 14 and the fourth terminal portion 17.

As illustrated in FIG. 9A, the first resistor 18 is connected in parallel to the first capacitor group 12 with one end thereof connected to the first terminal portion 14. The second resistor 19 is connected in parallel to the second capacitor group 13 with one end thereof connected to the fourth terminal portion 17.

When the power conversion apparatus 1 for use in the low DC voltage mode is manufactured, as illustrated in FIG. 9B, the first resistor 18 and the second resistor 19 are not mounted. Then, the first terminal portion 14, which is a land not used because no component is mounted, and the third terminal portion 16 are electrically connected by the first electrical conductor 21. In addition, the second terminal portion 15 and the fourth terminal portion 17, which is a land not used because no component is mounted, are electrically connected by the second electrical conductor 22. In this manner, the first capacitor group 12 and the second capacitor group 13 illustrated in FIG. 9B are connected in parallel.

When the power conversion apparatus 1 for use in the high DC voltage mode is manufactured, as illustrated in FIG. 9C, the first resistor 18 is connected in parallel to the first capacitor group 12 with one end thereof connected to the first terminal portion 14. In addition, the second resistor 19 is connected in parallel to the second capacitor group 13 with one end thereof connected to the fourth terminal portion 17. Then, the second terminal portion 15 and the third terminal portion 16 are electrically connected by the third electrical conductor 23. In this manner, the first capacitor group 12 and the second capacitor group 13 illustrated in FIG. 9C are connected in series.

In the first embodiment and the second embodiment, a land is preferably provided on the insulating substrate for each of the two connection portions for the first resistor 18, the two connection portions for the second resistor 19, the first terminal portion 14, the second terminal portion 15 (and 15'), the third terminal portion 16 (and 16'), and the fourth terminal portion 17. In contrast, in the third embodiment, one of the two connection portions for the first resistor 18 and the first terminal portion 14 are unified, and one of the two connection portions for the second resistor 19 and the fourth terminal portion 17 are unified; therefore, the footprint of components mounted on the insulating substrate may be reduced. Note that, as described with respect to the first embodiment, the distance between the first terminal portion 14 and the third terminal portion 16 and the distance between the second terminal portion 15 and the fourth terminal portion 17 may be approximately equal, and as described with respect to the second embodiment, the distance between the first terminal portion 14 and the third terminal portion 16, the distance between the second terminal portion 15 and the fourth terminal portion 17, and the distance between the second terminal portion 15 and the third terminal portion 16 may be approximately equal.

Setting of the connection relation between the first capacitor group 12 and the second capacitor group 13 using the first electrical conductor 21, the second electrical conductor 22, and the third electrical conductor 23 in the power conversion apparatus 1 according to the first to third embodiments described above is performed in the production of the power conversion apparatus 1 (or in the production of the motor drive apparatus 100 including the power conversion apparatus 1). In other words, in a process for manufacturing the power conversion apparatus 1 to be connected to a low-voltage AC power supply, an operator electrically connects the first terminal portion 14 to the third terminal portion 16 by the first electrical conductor 21 and electrically connects the second terminal portion 15 to the fourth terminal portion 17 by the second electrical conductor 22 to manufacture the power conversion apparatus 1 for use in the low DC voltage mode. In a process for manufacturing the power conversion apparatus 1 to be connected to a high-voltage AC power supply, the operator electrically connects the second terminal portion 15 (or 15') to the third terminal portion 16 (or 16') by the third electrical conductor 23 to manufacture the power conversion apparatus 1 for use in the high DC voltage mode. In addition, when reworking the power conversion apparatus 1 that has been already manufactured, the operator may switch, using the first electrical conductor 21, the second electrical conductor 22, and the third electrical conductor 23, the setting of the connection relation between the first capacitor group 12 and the second capacitor group 13 from the low DC voltage mode to the high DC voltage mode or from the high DC voltage mode to the low DC voltage mode. Note that, although, in the first to third embodiments described above, manufacture of the power conversion apparatus 1 is assumed to be done by an operator, the power conversion apparatus 1 may be manufactured by an operator in cooperation with a machine tool instead, or the power conversion apparatus 1 may be manufactured by a machine tool alone.

Figure 10:
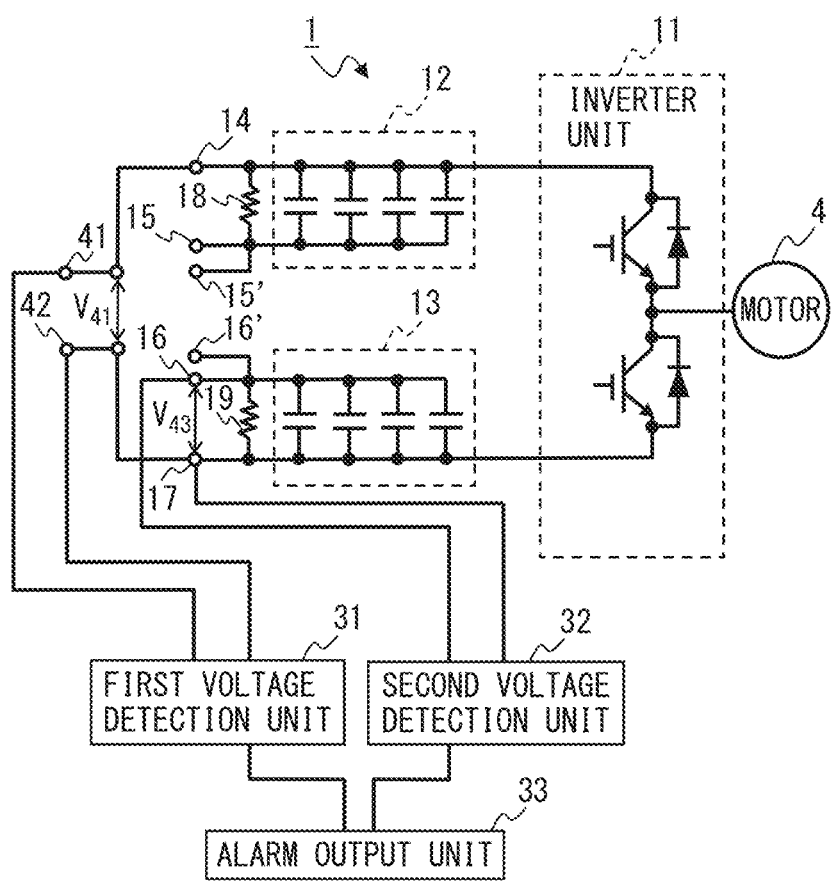
FIG. 10 is a circuit diagram illustrating a power conversion apparatus according to a fourth embodiment of the present disclosure.

Next, the fourth embodiment of the present disclosure will be described. FIG. 10 is a circuit diagram illustrating a power conversion apparatus according to the fourth embodiment of the present disclosure.

The fourth embodiment is defined by making it possible, in the production of the power conversion apparatus 1 according to the first to third embodiments, to inspect whether an abnormality has occurred in the power conversion apparatus 1. Examples of an abnormality in the power conversion apparatus 1 that can be found by means of an inspection in the fourth embodiment include a short circuit or burnout of a capacitor in the first capacitor group 12 and the second capacitor group 13, a failure of a semiconductor switching element in the power conversion apparatus 1, and a short circuit of various types of wirings in the power conversion apparatus 1. In addition, the inspection in the fourth embodiment may determine whether the power conversion apparatus 1 for use in the DC power mode as intended by an operator has been successfully manufactured.

According to the fourth embodiment, the power conversion apparatus 1 further includes a first voltage detection unit 31, a second voltage detection unit 32, and an alarm output unit 33.

The first voltage detection unit 31 detects a voltage $V_{41}$ generated between the fourth terminal portion 17 and the first terminal portion 14. As described above, the DC positive terminal 41 and the first terminal portion 14 are at the same potential, and the DC negative terminal 42 and the fourth terminal portion 17 are at the same potential; consequently, the voltage generated between the fourth terminal portion 17 and the first terminal portion 14 and a voltage generated between the DC positive terminal 41 and the DC negative terminal 42 have the same magnitude, i.e., $V_{41}$. Therefore, as illustrated in FIG. 10, in order to detect the voltage generated between the fourth terminal portion 17 and the first terminal portion 14, the first voltage detection unit 31 detects the voltage $V_{41}$ generated between the DC positive terminal 41 and the DC negative terminal 42. The voltage $V_{41}$ generated between the DC positive terminal 41 and the DC negative terminal 42 is a so-called "DC link voltage," which is used for controlling the inverter unit 11 in the power conversion apparatus 1 or controlling the motor drive apparatus 100 including the power conversion apparatus 1. Since the power conversion apparatus 1 and the motor drive apparatus 100 typically include a voltage detector for detecting the DC link voltage, the voltage detector may be utilized as the first voltage detection unit 31.

The second voltage detection unit 32 detects a voltage $V_{43}$ generated between the fourth terminal portion 17 and the third terminal portion 16 (or 16'). Similarly to the aforementioned first voltage detection unit 31, when the power conversion apparatus 1 or the motor drive apparatus 100 includes a voltage detector for detecting the DC link voltage, the voltage detector may be utilized as the second voltage detection unit 32.

The first voltage detection unit 31 and the second voltage detection unit 32 are constructed from, for example, a combination of an operational amplifier, a logic IC, and an isolator, an isolated AD converter, or the like.

When the first capacitor group 12 and the second capacitor group 13 are charged, the alarm output unit 33 outputs an alarm according to the voltage $V_{41}$ between the fourth terminal portion 17 and the first terminal portion 14, which is detected by the first voltage detection unit 31, and the voltage $V_{43}$ between the fourth terminal portion 17 and the third terminal portion 16, which is detected by the second voltage detection unit 32.

The alarm output unit 33 may be constructed, for example, in a software program form or from a combination of various types of electronic circuits and a software program. When the alarm output unit 33 is constructed, for example, in a software program form, functions of the alarm output unit 33 described above may be achieved by operating an arithmetic processing unit in accordance with the software program. Alternatively, the alarm output unit 33 may be constructed as a semiconductor integrated circuit into which a software program for achieving the functions of the alarm output unit 33.

Inspection of the power conversion apparatus 1 is performed by monitoring the voltage $V_{41}$ between the fourth terminal portion 17 and the first terminal portion 14 and the voltage $V_{43}$ between the fourth terminal portion 17 and the third terminal portion 16. Conditions for outputting an alarm from the alarm output unit 33 are different between the power conversion apparatus 1 manufactured for use in the low DC voltage mode and the power conversion apparatus 1 manufactured for use in the high DC voltage mode. As a preliminary step toward inspecting the power conversion apparatus 1, the first capacitor group 12 and the second capacitor group 13 are charged in advance. In addition, information indicating whether the power conversion apparatus 1 is for use in the low DC voltage mode or the high DC voltage mode is input in advance into the alarm output unit 33 through an input device (not illustrated) such as a keyboard, a mouse, or a touchscreen. After these two advance preparations, the following inspection is performed individually for the power conversion apparatus 1 manufactured for use in the low DC voltage mode and the power conversion apparatus 1 manufactured for use in the high DC voltage mode.

For the power conversion apparatus 1 manufactured for use in the low DC voltage mode, the first capacitor group 12 and the second capacitor group 13 are connected in parallel via the first electrical conductor 21 and the second electrical conductor 22; therefore, if there is no abnormality, the voltage $V_{41}$ between the fourth terminal portion 17 and the first terminal portion 14 should be equal to the voltage $V_{43}$ between the fourth terminal portion 17 and the third terminal portion 16. To put it the other way around, when the voltage $V_{41}$ between the fourth terminal portion 17 and the first terminal portion 14 and the voltage $V_{43}$ between the fourth terminal portion 17 and the third terminal portion 16 are not equal, it means that there is some abnormality in the power conversion apparatus 1. Therefore, in the power conversion apparatus 1 manufactured for use in the low DC voltage mode, when the voltage $V_{41}$ between the fourth terminal portion 17 and the first terminal portion 14, which is detected by the first voltage detection unit 31, and the voltage $V_{43}$ between the fourth terminal portion 17 and the third terminal portion 16, which is detected by the second voltage detection unit 32, are not equal, the alarm output unit 33 is caused to output an alarm. Note that the voltages across the first capacitor group 12 and across the second capacitor group 13 may have slight fluctuations. Accordingly, the alarm output unit 33 is caused to output an alarm, in a state in which the first capacitor group 12 and the second capacitor group 13 of the power conversion apparatus 1 manufactured for use in the low DC voltage mode are charged, when difference between the voltage $V_{41}$ between the fourth terminal portion 17 and the first terminal portion 14, which is detected by the first voltage detection unit 31, and the voltage $V_{43}$ between the fourth terminal portion 17 and the third terminal portion 16, which is detected by the second voltage detection unit 32 is out of a predefined first voltage range. In this case, the aforementioned first voltage range used in the determination process by the alarm output unit 33 is set to, for example, a few percent of the voltage $V_{41}$ (DC link voltage) between the fourth terminal portion 17 and the first terminal portion 14.

For the power conversion apparatus 1 manufactured for use in the high DC voltage mode, the first capacitor group 12 and the second capacitor group 13 are connected in series via the third electrical conductor 23; therefore, if there is no abnormality, the voltage $V_{41}$ between the fourth terminal portion 17 and the first terminal portion 14 should be twice as much as the voltage $V_{43}$ between the fourth terminal portion 17 and the third terminal portion 16. To put it the other way around, when the voltage $V_{41}$ between the fourth terminal portion 17 and the first terminal portion 14 is not twice as much as the voltage $V_{43}$ between the fourth terminal portion 17 and the third terminal portion 16, it means that there is some abnormality in the power conversion apparatus 1. Therefore, in the power conversion apparatus 1 manufactured for use in the high DC voltage mode, when the voltage $V_{41}$ between the fourth terminal portion 17 and the first terminal portion 14, which is detected by the first voltage detection unit 31, is not approximately twice as much as the voltage $V_{43}$ between the fourth terminal portion 17 and the third terminal portion 16, which is detected by the second voltage detection unit 32, the alarm output unit 33 is caused to output an alarm. As described above, the voltages across the first capacitor group 12 and across the second capacitor group 13 may have slight fluctuations. Accordingly, the alarm output unit 33 is caused to output an alarm, in a state in which the first capacitor group 12 and the second capacitor group 13 of the power conversion apparatus 1 manufactured for use in the high DC voltage mode are charged, when difference between the voltage $V_{41}$ between the fourth terminal portion 17 and the first terminal portion 14, which is detected by the first voltage detection unit 31, and twice the voltage $V_{43}$ between the fourth terminal portion 17 and the third terminal portion 16, which is detected by the second voltage detection unit 32 is out of a predefined second voltage range. In this case, the aforementioned second voltage range used in the determination process by the alarm output unit 33 is set to, for example, a few percent of the voltage $V_{41}$ (DC link voltage) between the fourth terminal portion 17 and the first terminal portion 14.

Note that an alarm unit (not illustrated) may be provided for informing an operator of occurrence of an abnormality using an alarm output from the alarm output unit 33. Examples of means for the alarm unit include a display that comes with the power conversion apparatus 1, the motor drive apparatus 100, or a high-level controller, a personal computer, a mobile terminal, and a display such as a touchscreen. For example, a sign such as "Abnormality occurred" may be displayed on a display. The alarm unit may be realized, for example, as sound equipment that emits a sound such as a sound, a loudspeaker, a buzzer, a chime, or the like. Alternatively, the alarm may be presented in a form of a sign printed on paper or the like using a printer. Alternatively, the alarm unit may be realized by appropriately combining these.

Figure 11:
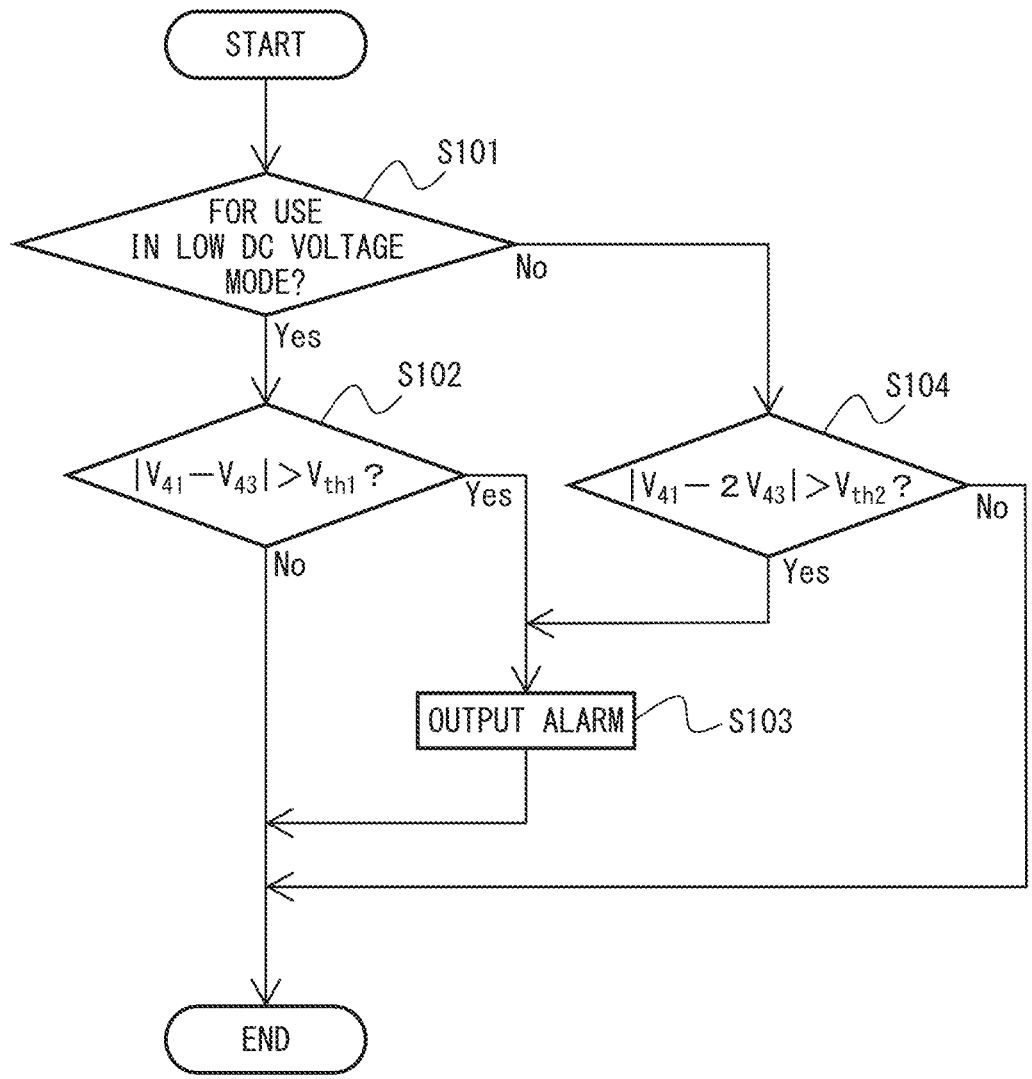
FIG. 11 is a flowchart illustrating an inspection process in the production of the power conversion apparatus according to the fourth embodiment of the present disclosure.

FIG. 11 is a flowchart illustrating an inspection process in the production of the power conversion apparatus according to the fourth embodiment of the present disclosure.

In the production of the power conversion apparatus 1, when the power conversion apparatus 1 for use in the low DC voltage mode is manufactured, an operator electrically connects the first terminal portion 14 to the third terminal portion 16 (or 16') by the first electrical conductor 21, and electrically connects the second terminal portion 15 (or 15') to the fourth terminal portion 17 by the second electrical conductor 22. When the power conversion apparatus 1 for use in the high DC voltage mode is manufactured, the operator electrically connects the second terminal portion 15 (or 15') to the third terminal portion 16 (or 16') by the third electrical conductor 23.

When inspecting the manufactured power conversion apparatus 1, the operator charges the first capacitor group 12 and the second capacitor group 13 in advance. In addition, information indicating whether the power conversion apparatus 1 to be inspected is for use in the low DC voltage mode or the high DC voltage mode is input in advance into the alarm output unit 33 through an input device such as a keyboard, a mouse, or a touchscreen.

The voltages of the first capacitor group 12 and the second capacitor group 13, which have been charged, are respectively detected by the first voltage detection unit 31 and the second voltage detection unit 32. Specifically, the first voltage detection unit 31 detects the voltage $V_{41}$ generated between the fourth terminal portion 17 and the first terminal portion 14. The second voltage detection unit 32 detects the voltage $V_{43}$ generated between the fourth terminal portion 17 and the third terminal portion 16 (or 16').

In step S101, the alarm output unit 33 determines whether the power conversion apparatus 1 to be inspected is for use in the low DC voltage mode or the high DC voltage mode. Determination by the alarm output unit 33 is made according to the information indicating whether the power conversion apparatus 1 is for use in the low DC voltage mode or the high DC voltage mode, which has been input in advance into the alarm output unit 33. When it is determined in step S101 that the power conversion apparatus 1 is for use in the low DC voltage mode, the process proceeds to step S102; when it is determined in step S101 that the power conversion apparatus 1 is for use in the high DC voltage mode, the process proceeds to step S103.

In step S102, the alarm output unit 33 determines whether the difference "$V_{41}-V_{43}$" between the voltage $V_{41}$ between the fourth terminal portion 17 and the first terminal portion 14, which is detected by the first voltage detection unit 31, and the voltage $V_{43}$ between the fourth terminal portion 17 and the third terminal portion 16, which is detected by the second voltage detection unit 32 is out of the predefined first voltage range. The first voltage range is set in advance before starting the inspection. For example, when a first threshold $V_{th1}$ is a positive value, the first voltage range defined as a range from $-V_{th1}$ to $V_{th1}$ is set. The alarm output unit 33 may determine whether the absolute value of "$V_{41}-V_{43}$", i.e., "$|V_{41}-V_{43}|$" exceeds the first threshold $V_{th1}$ to determine whether the difference "$V_{41}-V_{43}$" between the voltage $V_{41}$ between the fourth terminal portion 17 and the first terminal portion 14 and the voltage $V_{43}$ between the fourth terminal portion 17 and the third terminal portion 16 is out of the first voltage range. In step S102, when it is determined that the difference "$V_{41}-V_{43}$" between the voltage $V_{41}$ between the fourth terminal portion 17 and the first terminal portion 14 and the voltage $V_{43}$ between the fourth terminal portion 17 and the third terminal portion 16 is within the first voltage range, the power conversion apparatus 1 manufactured for use in the low DC voltage mode is normal; then, the inspection process is completed. In step S102, when it is determined that the difference "$V_{41}-V_{43}$" between the voltage $V_{41}$ between the fourth terminal portion 17 and the first terminal portion 14 and the voltage $V_{43}$ between the fourth terminal portion 17 and the third terminal portion 16 is out of the first voltage range, the process proceeds to step S103.

In step S104, the alarm output unit 33 determines whether the difference "$V_{41}-2V_{43}$" between the voltage $V_{41}$ between the fourth terminal portion 17 and the first terminal portion 14, which is detected by the first voltage detection unit 31, and twice the voltage $V_{43}$ between the fourth terminal portion 17 and the third terminal portion 16, which is detected by the second voltage detection unit 32 is within the predefined second voltage range. The second voltage range is set in advance before starting the inspection. For example, when a second threshold $V_{th2}$ is a positive value, the second voltage range defined as a range from $-V_{th2}$ to $V_{th2}$ is set. The alarm output unit 33 may determine whether the absolute value of "$V_{41}-2V_{43}$", i.e., "$|V_{41}-2V_{43}|$" exceeds the second threshold $V_{th2}$ to determine whether the difference "$V_{41}-2V_{43}$" between the voltage $V_{41}$ between the fourth terminal portion 17 and the first terminal portion 14 and twice the voltage $V_{43}$ between the fourth terminal portion 17 and the third terminal portion 16 is out of the second voltage range. In step S104, when it is determined that the difference "$V_{41}-2V_{43}$" between the voltage $V_{41}$ between the fourth terminal portion 17 and the first terminal portion 14 and twice the voltage $V_{43}$ between the fourth terminal portion 17 and the third terminal portion 16 is within the second voltage range, the power conversion apparatus 1 manufactured for use in the high DC voltage mode is normal; then, the inspection process is completed. In step S104, when it is determined that the difference "$V_{41}-2V_{43}$" between the voltage $V_{41}$ between the fourth terminal portion 17 and the first terminal portion 14 and twice the voltage $V_{43}$ between the fourth terminal portion 17 and the third terminal portion 16 is out of the second voltage range, the process proceeds to step S103.

In step S103, the alarm output unit 33 outputs an alarm; then, the inspection process is completed. Alternatively, as described above, an alarm unit (not illustrated) may be provided after the alarm output unit 33, and the alarm unit may inform an operator of occurrence of an abnormality on the basis of the alarm output from the alarm output unit 33.

Figure 12:
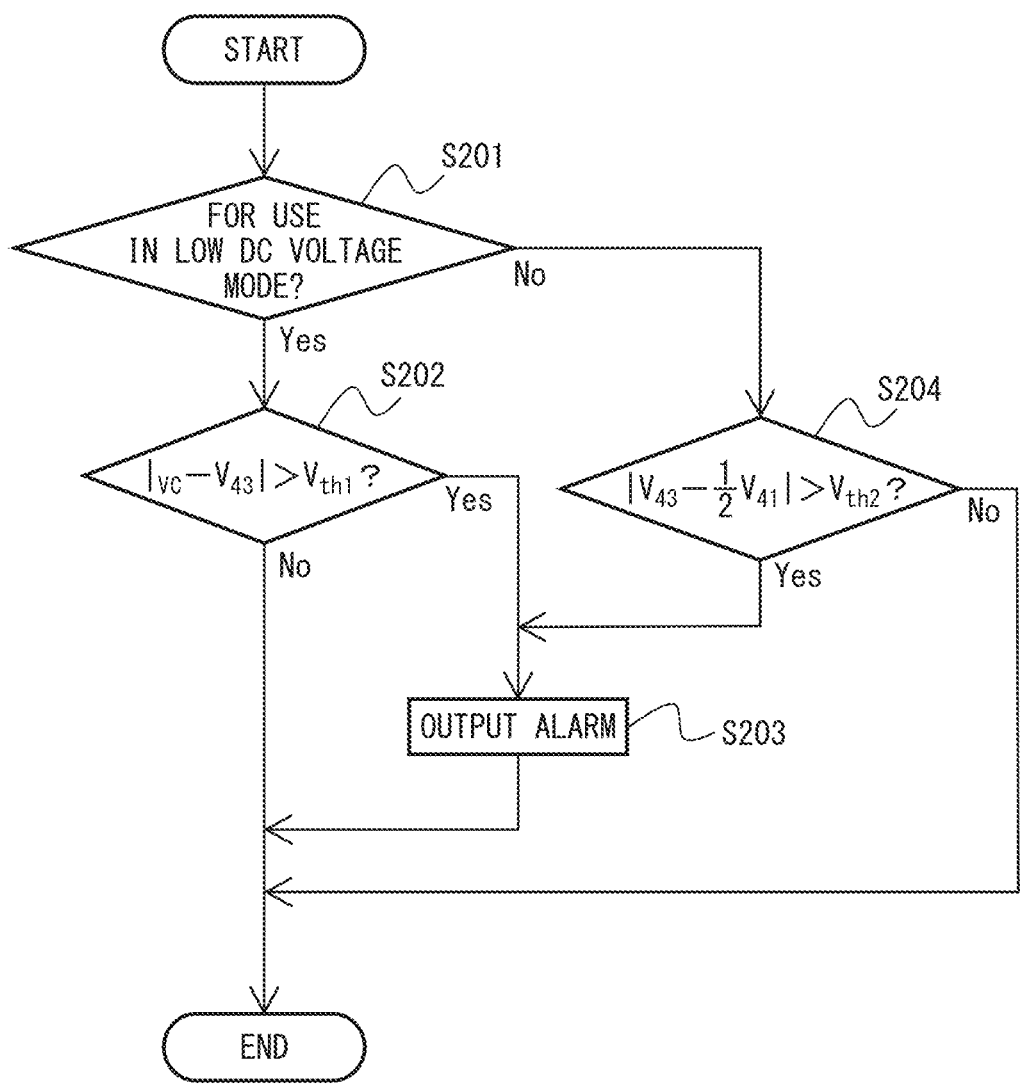
FIG. 12 is a flowchart illustrating a variation of the inspection process in the production of the power conversion apparatus according to the fourth embodiment of the present disclosure.

FIG. 12 is a flowchart illustrating a variation of the inspection process in the production of the power conversion apparatus according to the fourth embodiment of the present disclosure. The present variation is defined by modifying the determination condition in step S204 of FIG. 11.

Each process of steps S201 to S203 is respectively similar to each process of steps S101 to S103 of FIG. 11.

In step S204, the alarm output unit 33 determines whether the difference "$V_{43}-V_{41}\times\frac{1}{2}$" between half the voltage $V_{41}$ between the fourth terminal portion 17 and the first terminal portion 14, which is detected by the first voltage detection unit 31, and the voltage $V_{43}$ between the fourth terminal portion 17 and the third terminal portion 16, which is detected by the second voltage detection unit 32, is within the predefined second voltage range. The alarm output unit 33 may determine whether the absolute value of "$V_{43}-V_{41}\times\frac{1}{2}$", i.e., "$|V_{43}-V_{41}\times\frac{1}{2}|$" exceeds the second threshold $V_{th2}$ to determine whether the difference "$V_{41}-V_{43}\times\frac{1}{2}$" between half the voltage $V_{41}$ between the fourth terminal portion 17 and the first terminal portion 14 and the voltage $V_{43}$ between the fourth terminal portion 17 and the third terminal portion 16 is out of the second voltage range. In step S204, when it is determined that the difference "$V_{43}-V_{41}\times\frac{1}{2}$" between half the voltage $V_{41}$ between the fourth terminal portion 17 and the first terminal portion 14 and the voltage $V_{43}$ between the fourth terminal portion 17 and the third terminal portion 16 is within the second voltage range, the power conversion apparatus 1 manufactured for use in the high DC voltage mode is normal; then, the inspection process is completed. In step S204, when it is determined that the difference "$V_{43}-V_{41}\times\frac{1}{2}$" between half the voltage $V_{41}$ between the fourth terminal portion 17 and the first terminal portion 14 and the voltage $V_{43}$ between the fourth terminal portion 17 and the third terminal portion 16 is out of the second voltage range, the process proceeds to step S203.

The process of S101 to S104 and the process of S201 to S204 described above may be automatically processed by an inspection apparatus including the alarm output unit 33. For example, when the power conversion apparatus 1 or the motor drive apparatus 100 includes a voltage detector for detecting the DC link voltage, the voltage detector may be utilized as the first voltage detection unit 31 and the second voltage detection unit 32. In such a case, when the inspection apparatus including the alarm output unit 33 detects that the inspection apparatus is connected to the first voltage detection unit 31 and the second voltage detection unit 32, the inspection apparatus may automatically perform the process of S101 to S104 or the process of S201 to S204 described above. When the power conversion apparatus 1 or the motor drive apparatus 100 does not include a voltage detector for detecting the DC link voltage, an inspection apparatus including the first voltage detection unit 31, the second voltage detection unit 32, and the alarm output unit 33 may automatically perform the process of S101 to S104 or the process of S201 to S204 described above when the inspection apparatus detects that the inspection apparatus is connected to the power conversion apparatus 1 to be inspected.

According to one aspect of the present disclosure, a power conversion apparatus and a motor drive apparatus with ease of manufacture, which can support low AC supply voltage and high AC supply voltage, may be realized at low cost.

The invention claimed is:

1. A power conversion apparatus, comprising:
    an inverter unit configured to convert an input DC voltage into an AC voltage and outputting the AC voltage;
    a first capacitor group consisting of one capacitor or a plurality of capacitors connected in parallel to each other, an positive electrode of the first capacitor group electrically connected to an positive electrode on the DC input side of the inverter unit;
    a second capacitor group consisting of one capacitor or a plurality of capacitors connected in parallel to each other, a negative electrode of the second capacitor group electrically connected to a negative electrode of the DC input side of the inverter unit;
    a first terminal portion electrically connected to the positive electrode of the first capacitor group;
    a second terminal portion electrically connected to a negative electrode of the first capacitor group;
    a third terminal portion electrically connected to an positive electrode of the second capacitor group; and
    a fourth terminal portion electrically connected to the negative electrode of the second capacitor group,
    wherein a distance between the first terminal portion and the third terminal portion is approximately equal to a distance between the second terminal portion and the fourth terminal portion,
    wherein the distance between the first terminal portion and the third terminal portion, the distance between the second terminal portion and the fourth terminal portion, and a distance between the second terminal portion and the third terminal portion are approximately equal.

2. A motor drive apparatus, comprising:
    a rectifier configured to convert an AC voltage input from an AC power supply into a DC voltage and outputting the DC voltage; and
    the power conversion apparatus according to claim 1 connected to the rectifier, and configured to convert the DC voltage input from the rectifier into an AC voltage for driving a motor and outputting the AC voltage.

3. A power conversion apparatus, comprising:
    an inverter unit configured to convert an input DC voltage into an AC voltage and outputting the AC voltage;
    a first capacitor group consisting of one capacitor or a plurality of capacitors connected in parallel to each other, an positive electrode of the first capacitor group electrically connected to an positive electrode on the DC input side of the inverter unit;
    a second capacitor group consisting of one capacitor or a plurality of capacitors connected in parallel to each other, a negative electrode of the second capacitor group electrically connected to a negative electrode of the DC input side of the inverter unit;
    a first terminal portion electrically connected to the positive electrode of the first capacitor group;
    a second terminal portion electrically connected to a negative electrode of the first capacitor group;
    a third terminal portion electrically connected to an positive electrode of the second capacitor group; and
    a fourth terminal portion electrically connected to the negative electrode of the second capacitor group,
    wherein a distance between the first terminal portion and the third terminal portion is approximately equal to a distance between the second terminal portion and the fourth terminal portion,
    the power conversion apparatus further comprises:
        a first electrical conductor for electrically connecting the first terminal portion and the third terminal portion,
        a second electrical conductor for electrically connecting the second terminal portion and the fourth terminal portion, and
        a third electrical conductor for electrically connecting the second terminal portion and the third terminal portion,
    wherein a mode of a DC voltage to be input to the inverter unit can be selectively switched between
        a low DC voltage mode in which the first terminal portion and the third terminal portion are electrically connected by the first electrical conductor, and the second terminal portion and the fourth terminal portion are electrically connected by the second electrical conductor, and
        a high DC voltage mode in which the second terminal portion and the third terminal portion are electrically connected by the third electrical conductor.

4. The power conversion apparatus according to claim 3, comprising:
    a first resistor connected in parallel to the first capacitor group, one end of the first resistor connected to the first terminal portion when the parallel connection is made; and
    a second resistor connected in parallel to the second capacitor group, one end of the second resistor connected to the fourth terminal portion when the parallel connection is made, wherein, in the high DC voltage mode, the first resistor is connected in parallel to the first capacitor group and the second resistor is connected in parallel to the second capacitor group, and wherein, in the low DC voltage mode, the first resistor is detached from the first capacitor group and the second resistor is detached from the second capacitor group.

5. The power conversion apparatus according to claim 3, further comprising:
a first voltage detection unit configured to detect a voltage generated between the fourth terminal portion and the first terminal portion;
a second voltage detection unit configured to detect a voltage generated between the fourth terminal portion and the third terminal portion; and
an alarm output unit configured to output an alarm, when the first capacitor group and the second capacitor group are charged, according to a voltage between the fourth terminal portion and the first terminal portion detected by the first voltage detection unit and a voltage between the fourth terminal portion and the third terminal portion detected by the second voltage detection unit.

6. The power conversion apparatus according to claim 5, wherein the alarm output unit outputs an alarm, in a state in which the first capacitor group and the second capacitor group are charged in the low DC voltage mode, when difference between the voltage between the fourth terminal portion and the first terminal portion detected by the first voltage detection unit, and the voltage between the fourth terminal portion and the third terminal portion detected by the second voltage detection unit is out of a predefined first voltage range.

7. The power conversion apparatus according to claim 5, wherein the alarm output unit outputs an alarm, in a state in which the first capacitor group and the second capacitor group are charged in the high DC voltage mode, when difference between the voltage between the fourth terminal portion and the first terminal portion detected by the first voltage detection unit, and twice the voltage between the fourth terminal portion and the third terminal portion detected by the second voltage detection unit is out of a predefined second voltage range.

8. The power conversion apparatus according to claim 3, wherein each of the first electrical conductor, the second electrical conductor, and the third electrical conductor is constructed from a bus bar.

9. A motor drive apparatus, comprising:
a rectifier configured to convert an AC voltage input from an AC power supply into a DC voltage and outputting the DC voltage; and
the power conversion apparatus according to claim 3 connected to the rectifier, and configured to convert the DC voltage input from the rectifier into an AC voltage for driving a motor and outputting the AC voltage.

10. A power conversion apparatus, comprising:
an inverter unit configured to convert an input DC voltage into an AC voltage and outputting the AC voltage;
a first capacitor group consisting of one capacitor or a plurality of capacitors connected in parallel to each other, an positive electrode of the first capacitor group electrically connected to an positive electrode on the DC input side of the inverter unit;
a second capacitor group consisting of one capacitor or a plurality of capacitors connected in parallel to each other, a negative electrode of the second capacitor group electrically connected to a negative electrode of the DC input side of the inverter unit;
a first terminal portion electrically connected to the positive electrode of the first capacitor group;
a second terminal portion electrically connected to a negative electrode of the first capacitor group;
a third terminal portion electrically connected to an positive electrode of the second capacitor group; and
a fourth terminal portion electrically connected to the negative electrode of the second capacitor group,
wherein
a distance between the first terminal portion and the third terminal portion is approximately equal to a distance between the second terminal portion and the fourth terminal portion, and
each of the first terminal portion, the second terminal portion, the third terminal portion, and the fourth terminal portion is formed by a land of a through hole.

11. A motor drive apparatus, comprising:
a rectifier configured to convert an AC voltage input from an AC power supply into a DC voltage and outputting the DC voltage; and
the power conversion apparatus according to claim 10 connected to the rectifier, and configured to convert the DC voltage input from the rectifier into an AC voltage for driving a motor and outputting the AC voltage.

* * * * *